(12) United States Patent
Kim et al.

(10) Patent No.: US 12,368,616 B2
(45) Date of Patent: Jul. 22, 2025

(54) RECEIVER, OPERATION METHOD THEREOF, AND MEMORY DEVICE

(71) Applicant: SAMSUNG ELECTRONICS CO., LTD., Suwon-si (KR)

(72) Inventors: Jueon Kim, Suwon-si (KR); Taehyoung Kim, Singapore (SG); Donghyun Yoon, Singapore (SG); Myoungbo Kwak, Suwon-si (KR); Jaewoo Park, Suwon-si (KR); Youngdon Choi, Suwon-si (KR); Junghwan Choi, Suwon-si (KR)

(73) Assignees: SAMSUNG ELECTRONICS CO., LTD. (KR); NANYANG TECHNOLOGICAL UNIVERSITY, Singapore (SG)

( * ) Notice: Subject to any disclaimer, the term of this patent is extended or adjusted under 35 U.S.C. 154(b) by 33 days.

(21) Appl. No.: 18/530,274

(22) Filed: Dec. 6, 2023

(65) Prior Publication Data
US 2024/0414035 A1    Dec. 12, 2024

(30) Foreign Application Priority Data

Jun. 8, 2023    (KR) .................. 10-2023-0073731

(51) Int. Cl.
*H04L 25/49* (2006.01)
*H04L 7/033* (2006.01)
*H04L 25/03* (2006.01)

(52) U.S. Cl.
CPC ........ *H04L 25/4917* (2013.01); *H04L 7/0334* (2013.01); *H04L 25/03057* (2013.01)

(58) Field of Classification Search
CPC ............... H04L 25/4917; H04L 7/0334; H04L 25/0272; H04L 25/03057; H04L 25/03267; G06F 3/0658; G11C 7/1078
See application file for complete search history.

(56) References Cited

U.S. PATENT DOCUMENTS 7,983,368 B2 *   7/2011   Cranford, Jr. ........... H04L 7/042
                                                       327/158
8,750,406 B2     6/2014   Pan et al.
(Continued)

FOREIGN PATENT DOCUMENTS

| KR | 102257212 B1 | 5/2021 |
| KR | 20220050663 A | 4/2022 |
| KR | 102478277 B1 | 12/2022 |

OTHER PUBLICATIONS

Chiu, Po-Wei , et al., "A 32Gb/s Time-Based PAM-4 Transceiver for High-Speed DRAM Interfaces With In-Situ Channel Loss and Bit-Error-Rate Monitors", IEEE Transactions on Circuits and Systems—I: Regular Papers (vol. 69, Issue 5), 2022.

*Primary Examiner* — Dac V Ha
(74) *Attorney, Agent, or Firm* — Myers Bigel, P.A.

(57) ABSTRACT

A receiver includes a voltage-to-time converter configured to sequentially output a first converted signal and a second converted signal based on a first signal, a second signal, and a time difference; a first time comparator configured to determine a first bit value based on a first first-arrival signal (FAS) and output first data including the first bit value; a delay time generator configured to select a non-target signal and a target signal based on the first bit value and from among the first converted signal and the second converted signal; and a second time comparator configured to determine a second bit value based on a second FAS and output second data including the second bit value.

20 Claims, 20 Drawing Sheets

(56) References Cited

U.S. PATENT DOCUMENTS

| | | |
|---|---|---|
| 11,552,833 B2 | 1/2023 | Kim et al. |
| 11,770,126 B2 * | 9/2023 | Honarparvar ......... G04F 10/005 341/200 |
| 2010/0104000 A1 | 4/2010 | Pozzoni |
| 2016/0204768 A1 | 7/2016 | Luo et al. |
| 2022/0182264 A1 | 6/2022 | Yang et al. |
| 2022/0407749 A1 | 12/2022 | Hossain et al. |
| 2024/0120935 A1 * | 4/2024 | Safi-Harab ............ H03M 1/504 |
| 2024/0178857 A1 * | 5/2024 | Hyun ...................... H03M 1/38 |

* cited by examiner

FIG. 5A

| TX | IN<br>VREF3 ----⊥----<br>VREF2 --------<br>VREF1 --------<br>⊤<br>IP | IN<br>VREF3 ----⊥----<br>VREF2 --------<br>VREF1 ---▭---<br>IP |
|---|---|---|
| VTC | MN ┐         ┌ MP<br>   └──TD3──┘ | MN ┐  ┌ MP<br>   └TD1┘ |
| MSB[n] | 0 | 0 |

| n-1th 2-BIT DATA | 11 ||
|---|---|---|
| nth 2-BIT DATA | 0X | 1X |
| VTC (REQUESTED) |  |  |
| VTC (ACTUAL) |  |  |
| DFE |  |  |

| n−1th 2-BIT DATA | 10 | |
|---|---|---|
| nth 2-BIT DATA | 0X | 1X |
| VTC (REQUESTED) |  |  |
| VTC (ACTUAL) |  |  |
| DFE |  |  |

| n-1th 2-BIT DATA | 01 | |
|---|---|---|
| nth 2-BIT DATA | 0X | 1X |
| VTC (REQUESTED) |  |  |
| VTC (ACTUAL) |  |  |
| DFE |  |  |

| n-1th 2-BIT DATA | 00 | |
|---|---|---|
| nth 2-BIT DATA | 0X | 1X |
| VTC (REQUESTED) |  |  |
| VTC (ACTUAL) |  |  |
| DFE |  |  |

RECEIVER, OPERATION METHOD THEREOF, AND MEMORY DEVICE

CROSS-REFERENCE TO RELATED APPLICATION

This application is based on and claims priority under 35 U.S.C. § 119 to Korean Patent Application No. 10-2023-0073731, filed on Jun. 8, 2023, in the Korean Intellectual Property Office, the disclosure of which is incorporated by reference herein in its entirety.

TECHNICAL FIELD

The present disclosure relates to an electronic device, and more particularly, to a receiver, an operation method thereof, and a memory device.

BACKGROUND

There is a growing interest in high-speed transmission systems capable of high-speed data transmission. Demand for high-speed transmission systems is increasing in the field of multimedia requiring the transmission of a large amount of data. Data transmission methods include a non-return-to-zero (NRZ) method and an N-level pulse-amplitude modulation (PAM-N) method. The NRZ method transmits 1-bit data per one unit interval (UI) and the PAM-N method transmits k-bit data per one UI, where $2^k=N$. For example, 2-bit data may be transmitted using a PAM-4 method.

When transmitters transmit k-bit data to receivers during one UI by using the PAM-N method, receivers decode "k" bits during a data sampling period. To decode "k" bits, receivers need a plurality of threshold voltages and may require a plurality of comparators that compare the threshold voltages with the voltage level of a signal. Accordingly, the number of circuits included in receivers may increase or the structure of a circuit may be complex. Therefore, research into accurately and quickly performing the decoding operation of a receiver with only a simple circuit configuration is desired.

SUMMARY

The present disclosure provides a receiver for performing a decoding operation according to an N-level pulse-amplitude modulation (PAM-N) method, an operation method of the receiver, and a memory device.

According to an aspect of the present disclosure, a receiver includes a voltage-to-time converter configured to sequentially output a first converted signal and a second converted signal based on a first signal, a second signal, and a time difference, where the time difference is based on a difference between a first voltage level of the first signal and a second voltage level of the second signal; a first time comparator configured to determine a first bit value based on a first first-arrival signal (FAS) and output first data including the first bit value, where the first FAS includes one of the first converted signal and the second converted signal; a delay time generator configured to select a non-target signal and a target signal based on the first bit value, where the non-target signal and the target signal are selected from among the first converted signal and the second converted signal, where the delay time generator is configured to output a first delayed signal by delaying the target signal by a threshold delay time with respect to the non-target signal, where the delay time generator is configured to output a second delayed signal by delaying the non-target signal; and a second time comparator configured to determine a second bit value based on a second FAS and output second data including the second bit value, where the second FAS includes one of the first delayed signal and the second delayed signal.

According to another aspect of the present disclosure, an operation method of a receiver includes determining a time difference based on a difference between a first voltage level of a first signal and a second voltage level of a second signal; outputting a first converted signal and a second converted signal based on the time difference; selecting one of the first converted signal and the second converted signal as a first first-arrival signal (FAS) output; determining a first bit value based on a the first FAS output; outputting first data including the first bit value; determining a magnitude relationship between a first delay time and a second delay time based on the first bit value; outputting a first delayed signal and a second delayed signal based on the magnitude relationship; selecting one of the first delayed signal and the second delayed signal as a second FAS output; determining a second bit value based on the second FAS output; and outputting second data including the second bit value.

According to a further aspect of the present disclosure, a memory device includes a memory interface circuit configured to receive a data signal from a memory controller; and a control logic circuit configured to perform a control operation based on the data signal received from the memory interface circuit, where the memory interface circuit includes: a voltage-to-time conversion circuit configured to receive a first data signal and a second data signal and sequentially output a first converted signal and a second converted signal based on a time difference, where the time difference is based on a voltage level difference between the first data signal and the second data signal; a first time comparison circuit configured to receive the first converted signal and the second converted signal, determine a first bit value based on a first first-arrival signal (FAS), and output first data including the first bit value, where the first FAS includes one of the first converted signal and the second converted signal; a delay time generation circuit configured to receive the first data, the first converted signal, and the second converted signal, determine a magnitude relationship between a first delay time and a second delay time based on the first bit value, output a first delayed signal and a second delayed signal based on the magnitude relationship; and a second time comparison circuit configured to receive the first delayed signal and the second delayed signal, determine a second bit value based on a second FAS, and output second data including the second bit value, where the second FAS includes one of the first delayed signal and the second delayed signal.

BRIEF DESCRIPTION OF THE DRAWINGS

Embodiments will be more clearly understood from the following detailed description taken in conjunction with the accompanying drawings in which:

FIGS. 5A and 5B are diagrams illustrating operations of a voltage-to-time converter and a first time comparator in FIG. 4;

DETAILED DESCRIPTION OF THE EMBODIMENTS

Figure 1:
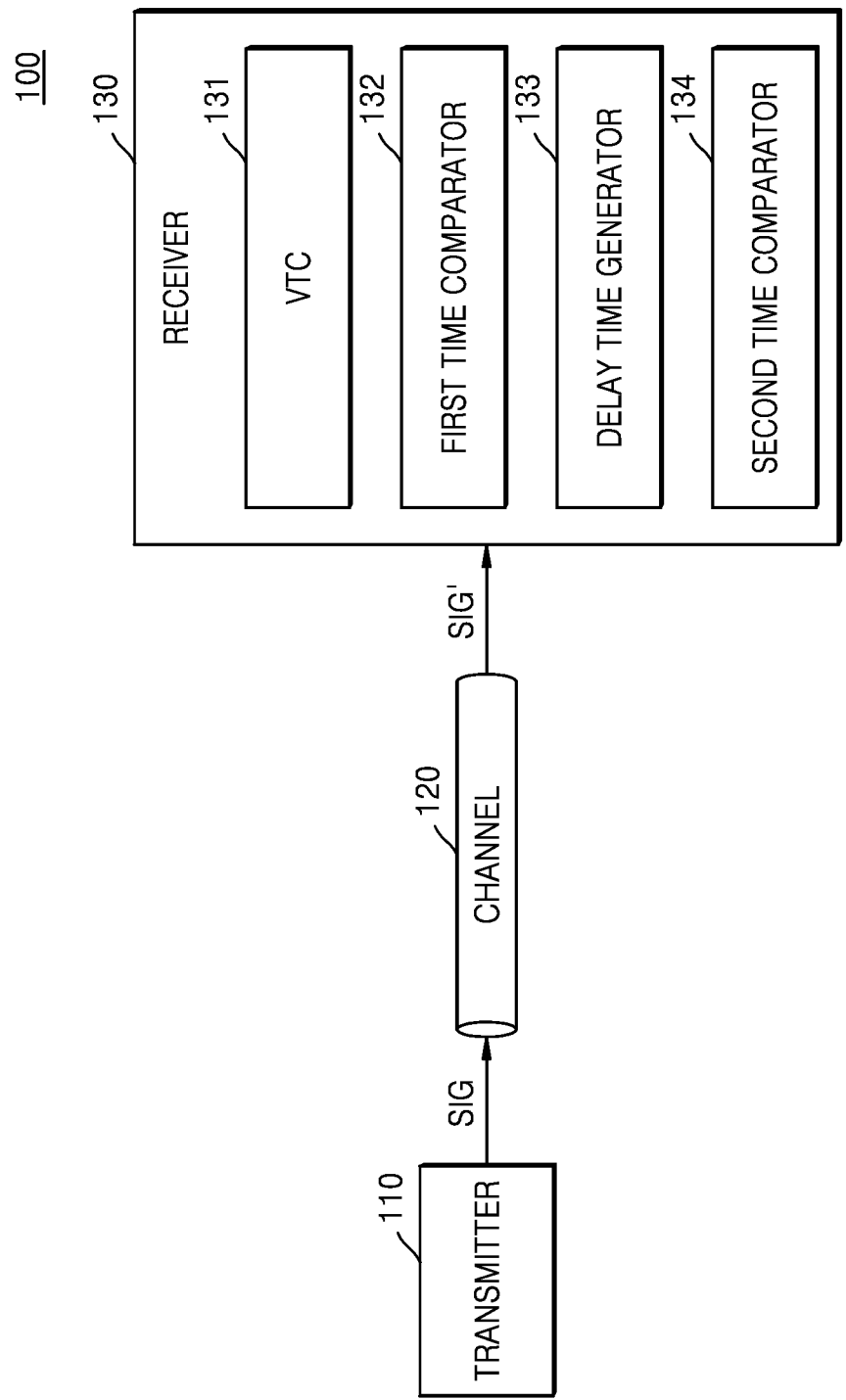
FIG. 1 is a diagram illustrating a transceiver according to example embodiments of the present disclosure.

To clarify the present disclosure, parts that are not connected with the description will be omitted, and the same elements or equivalents are referred to by the same reference numerals throughout the specification. Further, since sizes and thicknesses of constituent members shown in the accompanying drawings are arbitrarily given for better understanding and ease of description, the present disclosure is not limited to the illustrated sizes and thicknesses. In the drawings, the thickness of layers, films, panels, regions, etc., are exaggerated for clarity. In the drawings, for better understanding and ease of description, thicknesses of some layers and areas are excessively displayed.

In addition, unless explicitly described to the contrary, the word "comprises", and variations such as "comprises" or "comprising", will be understood to imply the inclusion of stated elements but not the exclusion of any other elements. As used herein, the phrase "at least one of A, B, and C" refers to a logical (A OR B OR C) using a non-exclusive logical OR, and should not be construed to mean "at least one of A, at least one of B and at least one of C." As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof. The term "and/or" includes any and all combinations of one or more of the associated listed items. The term "connected" may be used herein to refer to a physical and/or electrical connection and may refer to a direct or indirect physical and/or electrical connection.

Hereinafter, embodiments are described in detail with reference to the accompanying drawings.

FIG. 1 is a diagram illustrating a transceiver according to example embodiments of the present disclosure.

Referring to FIG. 1, a transceiver 100 may include a transmitter 110 and a receiver 130, which are configured to communicate with each other through a channel 120.

The transmitter 110 may transmit a signal SIG to the receiver 130 through the channel 120. In some embodiments, the transmitter 110 may convert parallel data into serial data to output the signal SIG. In some embodiments, the transmitter 110 may perform signal equalization in addition to data serialization to compensate for channel loss.

In some embodiments, the transmitter 110 may transmit the signal SIG by using an N-level pulse-amplitude modulation (PAM-N) method (e.g., a PAM-N signaling method, a PAM-N decoding method, or a PAM-N mode), where N is an integer of at least 3. The signal SIG may have one voltage level among N different voltage levels according to PAM-N. In a PAM-4 method, the transmitter 110 may transmit the signal SIG having one voltage level among four voltage levels. Four voltage levels may respectively correspond to, but are not limited, first to fourth logic values e.g., bit values (e.g., 00=00b, 01=01b, 10=10b, and 11=11b). According to various methods such as PAM-8 and PAM-16, the signal SIG may have one voltage level among eight or sixteen voltage levels, respectively.

In some embodiments, the signal SIG may include two differential signals having different polarities from each other. For example, the signal SIG may include a first differential signal and a second differential signal but is not limited thereto. Alternatively, the signal SIG may be configured as a single signal.

The channel 120 may be configured as an electrical path that connects the transmitter 110 to the receiver 130. For example, the channel 120 may include a printed circuit board (PCB) trace or a coaxial cable. The channel 120 may degrade high-frequency contents of high-speed random data due to skin effect, dielectric loss, etc. In other words, channel loss may occur in the signal SIG that is transmitted through the channel 120. In addition, the channel 120 may cause impedance discontinuity (or mismatch) due to connectors between boards and cables and other physical interfaces. Moreover, due to channel loss or bandwidth limitation, each of the bits in data that has passed through the channel 120 may interfere with the next bit and there may occur inter-symbol interference (ISI), in which a bit error rate or bit error ratio (BER) increases as neighboring symbols overlap each other. Because of the phenomena caused by the channel 120, a signal SIG' that has passed through the channel 120 may be partially distorted or deformed compared to the signal SIG.

When the signal SIG includes two differential signals having different polarities from each other, the signal SIG' may also include two differential signals.

The receiver 130 may receive the signal SIG' that has passed through the channel 120. The receiver 130 may decode data, based on the signal SIG', and may output decoded data. In some embodiments, the receiver 130 may convert serial data received from the transmitter 110 into parallel data. In some embodiments, the transmitter 110 may further perform signal equalization in addition to data parallelization to compensate for channel loss.

In some embodiments, the receiver 130 may include a voltage-to-time converter (VTC) 131, a first time comparator 132, a delay time generator 133, and a second time comparator 134.

The VTC 131 may receive the signal SIG'. The VTC 131 may convert the voltage level of the signals SIG' into a time difference between two signals. Based on the voltage level of the signal SIG' and a reference level, the VTC 131 may sequentially output converted signals with a time difference corresponding to the difference between the voltage level and the reference level. For example, when the voltage level of the signal SIG' is greater than the reference level, the VTC 131 may output a first converted signal first and then output a second converted signal after a certain time. When the voltage level of the signal SIG' is less than the reference level, the VTC 131 may output the second converted signal first and then output the first converted signal after a certain time. In some embodiments, when the signal SIG' includes two differential signals, the VTC 131 may convert a voltage level difference between the two differential signals into a time difference between converted signals.

The first time comparator 132 may receive converted signals from the VTC 131. The first time comparator 132 may determine a first bit value according to a converted signal that is input first thereto among the converted signals of the VTC 131. A converted signal that is input first to the first time comparator 132 among the converted signals input thereto may be referred to as a first first-arrival signal. The first time comparator 132 may output first data including the first bit value as decoded data (or as part of decoded data).

The delay time generator 133 may receive converted signals from the VTC 131. The delay time generator 133 may delay each of the converted signals. The delay time generator 133 may delay a first first-arrival signal among the converted signal and delay a converted signal input thereto later than the first first-arrival signal. At this time, a delay amount by which the first first-arrival signal is delayed may be greater than a delay amount by which the converted signal input later is delayed.

The second time comparator 134 may receive delayed signals from the delay time generator 133. The second time comparator 134 may determine a second bit value according to a delayed signal that is input first thereto among the delayed signals. A delayed signal that is input first among the delayed signals may be referred to as a second first-arrival signal. The second time comparator 134 may output second data including the second bit value as decoded data (or as part of decoded data).

In some embodiments, the receiver 130 may be embodied as a time-based receiver.

According to the description above, when a decoding operation in the PAM-N method is performed with the configuration of the receiver 130, the size of the receiver 130 and/or the transceiver 100 may be reduced and the receiver 130 and/or the transceiver 100 may be integrated.

In addition, when the decoding operation is performed with the configuration of the receiver 130, the power consumption of the receiver 130 and/or the transceiver 100 may be decreased.

Moreover, when the decoding operation is performed with the configuration of the receiver 130, the manufacturing cost and complexity of the receiver 130 and/or the transceiver 100 may be reduced.

According to the description above, a BER may decrease and ISI may be improved.

Figure 2A:
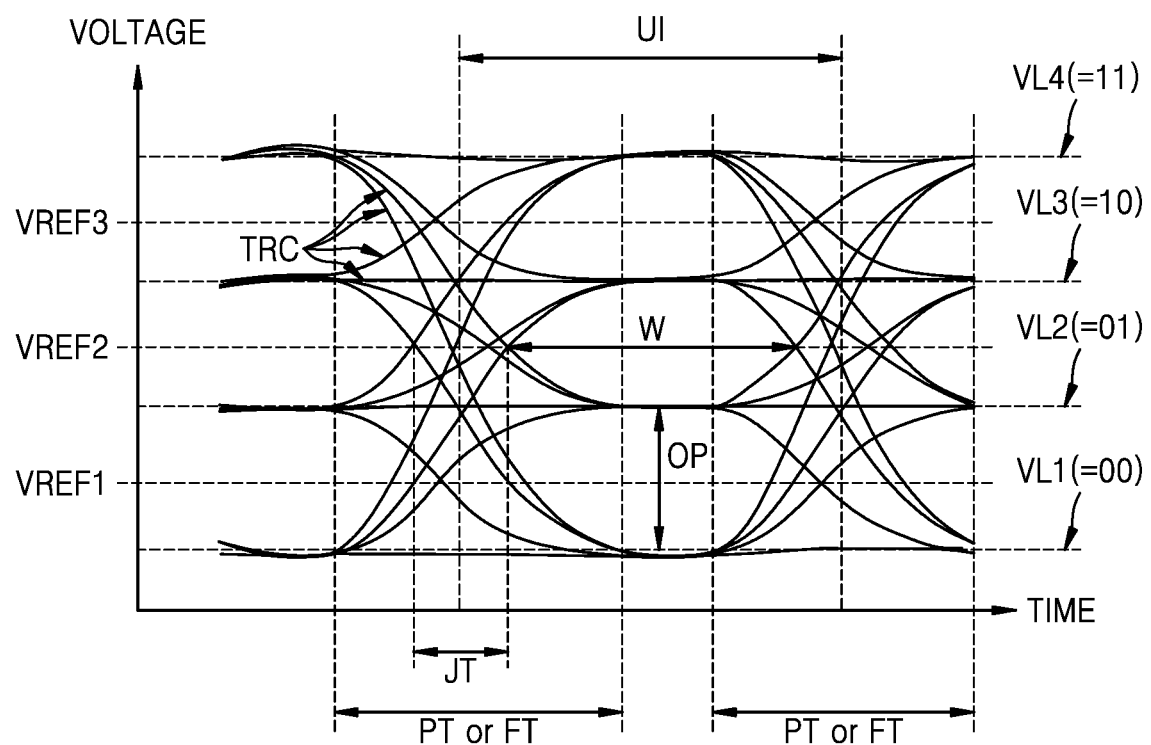
FIG. 2A is a diagram illustrating signals input to a receiver according to example embodiments of the present disclosure.
Figure 2B:
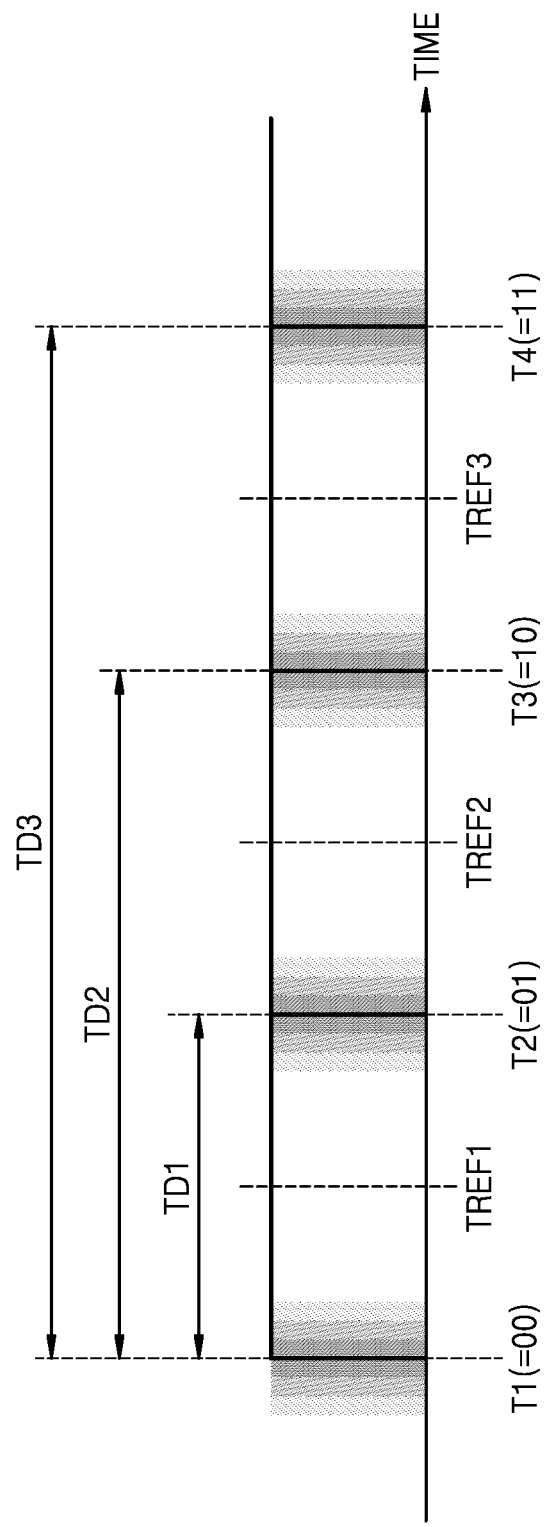
FIG. 2B is a diagram illustrating a method of converting voltage levels in FIG. 2A into times.

FIG. 2A is a diagram illustrating signals input to a receiver according to an embodiment. FIG. 2B is a diagram illustrating a method of converting voltage levels in FIG. 2A into times. In detail, FIG. 2A may illustrate an eye diagram of a signal, i.e., a PAM-4 signal, which is generated by a PAM-4 method. FIG. 2B is a graph illustrating a voltage level of a PAM-4 signal, which is converted based on time.

Referring to FIG. 2A, waveforms, in which bits of data transmitted in series overlap each other, may form a shape similar to the shape of an eye. Such waveforms may be referred to as an eye diagram. An eye diagram may be used to represent the quality of the signal SIG' in high-speed transmission. For example, in PAM-4, an eye diagram may represent four symbols (e.g., "00", "01", "10", and "11") of the signal SIG' and the four symbols may be respectively expressed as first to fourth voltage levels VL1, VL2, VL3, and VL4 that are different from one another. An eye diagram may be used to visually present signal integrity and may represent the noise margin of the signal SIG'.

To generate an eye diagram, an oscilloscope or other computing device may sample the signal SIG' according to a unit interval (UI) (e.g., a sample period or a bit period). The UI may be defined by a clock related to the transmission of the signal SIG'. An oscilloscope or other computing device may measure a voltage level of the signal SIG' during the UI and form traces TRC. The traces TRC may overlap each other so that various characteristics of the signal SIG' may be determined.

An eye diagram may be used to identify various signal characteristics, such as jitter, crosstalk, signal loss, signal-to-noise ratio (SNR), etc.

For example, an eye width W may be used to represent the timing synchronization or jitter effect of the signal SIG'. An eye opening OP may represent a peak-to-peak voltage difference between the first to fourth voltage levels VL1, VL2, VL3, and VL4 and may be related to a voltage margin for distinguishing the first to fourth voltage levels VL1, VL2, VL3, and VL4 from each other. To evaluate the performance of the transceiver 100, the eye opening OP may be measured in an eye diagram. A rising time RT or a falling time FT may represent a time taken for transition from one voltage level to another voltage level and may be related to a rising edge or a falling edge. The slope of each of the traces TRC during the rising time RT or the falling time FT may represent the sensitivity of the signal SIG' with respect to a timing error. Jitter JT may represent a timing error caused by misalignment between the rising time RT and the falling time FT and may occur when a rising edge or a falling edge occurs at a time that is different from an ideal time defined by a data clock. The jitter JT may be caused by signal reflection, inter-symbol interference, crosstalk, process-voltage-temperature (PVT) variation, random jitter, additional noise, or a combination thereof.

The first voltage level VL1 may be lower than the second voltage level VL2. The second voltage level VL2 may be lower than the third voltage level VL3. The third voltage level VL3 may be lower than the fourth voltage level VL4. The receiver 130 may set first to third reference levels VREF1, VREF2, and VREF3 in PAM-4. The first reference level VREF1 may be lower than the second reference level VREF2 and the second reference level VREF2 may be lower than the third reference level VREF3. The receiver 130 may decode a symbol of the signal SIG' by comparing the voltage level of the signal SIG' with the first to third reference levels VREF1, VREF2, and VREF3.

A first eye may be located between the first and second voltage levels VL1 and VL2, a second eye may be located between the second and third voltage levels VL2 and VL3, and a third eye may be located between the third and fourth voltage levels VL3 and VL4.

Some edges may influence the characteristic (size or shape) of each of the eyes. For example, a falling edge from the fourth voltage level VL4 to the first voltage level VL1 (i.e., "11"→"00"), a rising edge from the first voltage level VL1 to the second voltage level VL2 (i.e., "00"→"01"), a rising edge from the first voltage level VL1 to the fourth voltage level VL4 (i.e., "00"→"11"), and a falling edge from the second voltage level VL2 to the first voltage level VL1 (i.e., "01"→"00") may determine the characteristic of the first eye. For example, a rising edge and a falling edge between the second and fourth voltage levels VL2 and VL4 (i.e., "01"↔"11") and a rising edge and a falling edge between the first and third voltage levels VL1 and VL3 (i.e., "00"↔"10") may determine the characteristic of the second eye. For example, a rising edge and a falling edge between the third and fourth voltage levels VL3 and VL4 (i.e., "10"↔"11") and a rising edge and a falling edge between the first and fourth voltage levels VL1 and VL4 (i.e., "00"↔"11") may determine the characteristic of the third eye. Accordingly, it may be desirable to perform an equalization or equalizing operation on the edges that determine the characteristic of an eye.

Referring to FIGS. 2A and 2B, according to some embodiments, the receiver 130 may be embodied as a time-based receiver. A circuit configuration included in a time-based receiver may be simplified and the time-based receiver may have a large gain at a relatively low voltage.

In a time-based receiver, each of the first to fourth voltage levels VL1, VL2, VL3, and VL4 in FIG. 2A may correspond to a signal that has an edge occurring at a certain time in FIG. 2B. For example, the first voltage level VL1 may correspond to a signal that has an edge occurring at a first time T1, the second voltage level VL2 may correspond to a signal that has an edge occurring at a second time T2 after the first time T1, the third voltage level VL3 may correspond to a signal that has an edge occurring at a third time T3 after the second time T2, and the fourth voltage level VL4 may correspond to a signal that has an edge occurring at a fourth time T4 after the third time T3. For convenience of description, the first to fourth times T1, T2, T3, and T4 may be referred to as edge timings.

There may be a first time difference TD1 between the first time T1 and the second time T2, between the second time T2 and the third time T3, or between the third time T3 and the fourth time T4. There may be a second time difference TD2 between the first time T1 and the third time T3 or between the second time T2 and the fourth time T4. There may be a third time difference TD3 between the first time T1 and the fourth time T4. The first time difference TD1 may be less than the second time difference TD2. The second time difference TD2 may be less than the third time difference TD3. In some embodiments, the second time difference TD2 may be twice the first time difference TD1 and the third time difference TD3 may be triple the first time difference TD1.

The first to third reference levels VREF1, VREF2, and VREF3 in FIG. 2A may respectively correspond to first to third reference times TREF1, TREF2, and TREF3. For example, the first reference level VREF1 may correspond to the first reference time TREF1, the second reference level VREF2 may correspond to the second reference time TREF2, and the third reference level VREF3 may correspond to the third reference time TREF3. The first reference time TREF1 may be less than the second reference time TREF2. The second reference time TREF2 may be less than the third reference time TREF3.

According to the present disclosure, a time-based receiver may convert the voltage level of the signal SIG' into a signal having an edge occurring at a certain time and may decode a symbol of the signal SIG' by using the certain time (e.g., an edge timing), at which the edge occurs, and the first to third reference times TREF1, TREF2, and TREF3.

The embodiments of FIGS. 2A and 2B are described based on PAM-4 signals, but the present disclosure is not limited thereto. For example, with respect to a PAM-8 signal, there may be eight voltage levels, eight edge timings, seven reference levels for distinguishing the eight voltage levels from one another, and seven reference times for distinguishing the eight edge timings from one another. For example, with respect to a PAM-16 signal, there may be sixteen voltage levels, sixteen edge timings, fifteen reference levels, and fifteen reference times.

Figure 3:
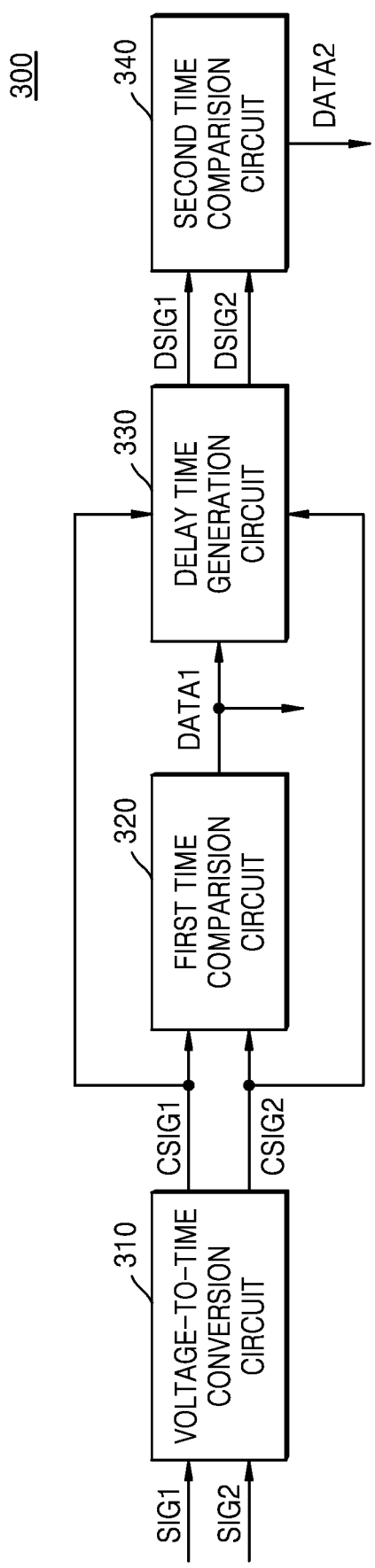
FIG. 3 is a block diagram of a receiver according to example embodiments of the present disclosure.

FIG. 3 is a block diagram of a receiver according to example embodiments.

Referring to FIGS. 1 and 3, according to some embodiments, a receiver 300 may be embodied as a time-based receiver. The receiver 300 may include a voltage-to-time conversion circuit 310, a first time comparison circuit 320, a delay time generation circuit 330, and a second time comparison circuit 340.

The voltage-to-time conversion circuit 310 may correspond to the VTC 131. The voltage-to-time conversion circuit 310 may receive a first signal SIG1 and a second signal SIG2 from the transmitter 110. The voltage-to-time conversion circuit 310 may sequentially output a first converted signal CSIG1 and a second converted signal CSIG2 with a certain time difference based on the first signal SIG1 and the second signal SIG2. The certain time difference may correspond to a comparison relationship between the voltage level of the first signal SIG and the voltage level of the second signal SIG2. For example, the certain time difference may be determined according to the difference between the voltage level of the first signal SIG1 and the voltage level of the second signal SIG2. The certain time difference is described below with reference to FIGS. 5A and 5B.

In some embodiments, the first signal SIG1 and the second signal SIG2, which may be data signals, may respectively correspond to differential signals, which respectively have opposite polarities from each other. For example, a data signal may include a specific logic value (or bit value) of a command, an address, data, or the like. In some embodiments, one of the first signal SIG1 and the second signal SIG2 may correspond to a single data signal and the other one may correspond to a reference signal for comparison of the voltage level of the single data signal.

In some embodiments, the voltage-to-time conversion circuit 310 may convert the first signal SIG1 and the second signal SIG2 into the first converted signal CSIG1 and the second converted signal CSIG2 in response to a clock signal. The clock signal may include an external clock signal provided from the outside or an internal clock signal generated by an internal clock generator processing the external clock signal.

The first time comparison circuit 320 may correspond to the first time comparator 132. The first time comparison circuit 320 may receive the first converted signal CSIG1 and the second converted signal CSIG2. The first time comparison circuit 320 may determine a first bit value according to a first first-arrival signal among the first converted signal CSIG1 and the second converted signal CSIG2. For example, when the first converted signal CSIG1 is the first first-arrival signal, the first bit value may correspond to a first value. When the second converted signal CSIG2 is the first first-arrival signal, the first bit value may correspond to a second value. The first value may be "1 (=1b)" and the second value may be "0 (=0b)". However, embodiments are not limited thereto. The first value may be "0" and the second value may be "1". The first time comparison circuit 320 may output first data DATA1 including the first bit value. The first data DATA1 may correspond to decoded data.

The delay time generation circuit 330 may correspond to the delay time generator 133. The delay time generation circuit 330 may receive the first data DATA1, the first converted signal CSIG1, and the second converted signal CSIG2.

In some embodiments, the delay time generation circuit 330 may determine a non-target signal and a target signal among the first converted signal CSIG1 and the second converted signal CSIG2 according to the first bit value of the first data DATA1. Here, the target signal may correspond to a signal to be delayed more than the non-target signal by a threshold delay time. The non-target signal may correspond to a signal to be less delayed than the target signal. For example, when the first bit value corresponds to the first value, the target signal may be the first converted signal CSIG1 and the non-target signal may be the second converted signal CSIG2. When the first bit value corresponds to the second value, the target signal may be the second converted signal CSIG2 and the non-target signal may be the first converted signal CSIG1. However, embodiments are not limited thereto. The delay time generation circuit 330 may output a first delayed signal DSIG and a second delayed signal DSIG2. In an embodiment, the first delayed signal DSIG1 may result from delaying a converted signal, which is selected as the target signal, more than the non-target signal by the threshold delay time. The second delayed signal DSIG2 may result from delaying a converted signal, which is selected as the non-target signal.

In some embodiments, the delay time generation circuit 330 may determine a magnitude relationship between a first delay time and a second delay time according to the first bit value of the first data DATA1. The first delay time may correspond to a delay amount by which the first converted signal CSIG1 is delayed. The second delay time may correspond to a delay amount by which the second converted signal CSIG2 is delayed. For example, when the first bit value corresponds to the first value, the first delay time may be greater than the second delay time. When the first bit value corresponds to the second value, the first delay time may be less than the second delay time. However, embodiments are not limited thereto. The delay time generation circuit 330 may delay the first converted signal CSIG1 by the first delay time and output the first delayed signal DSIG1. The delay time generation circuit 330 may delay the second converted signal CSIG2 by the second delay time and output the second delayed signal DSIG2.

The second time comparison circuit 340 may correspond to the second time comparator 134. The second time comparison circuit 340 may receive the first delayed signal DSIG1 and the second delayed signal DSIG2. The second time comparison circuit 340 may determine a second bit value according to a second first-arrival signal among the first delayed signal DSIG1 and the second delayed signal DSIG2. For example, when the second first-arrival signal is the first delayed signal DSIG1, the second bit value may correspond to the first value. When the second first-arrival signal is the second delayed signal DSIG2, the second bit value may correspond to the second value. The second time comparison circuit 340 may output second data DATA2 including the second bit value. The second data DATA2 may correspond to decoded data.

Figure 4:
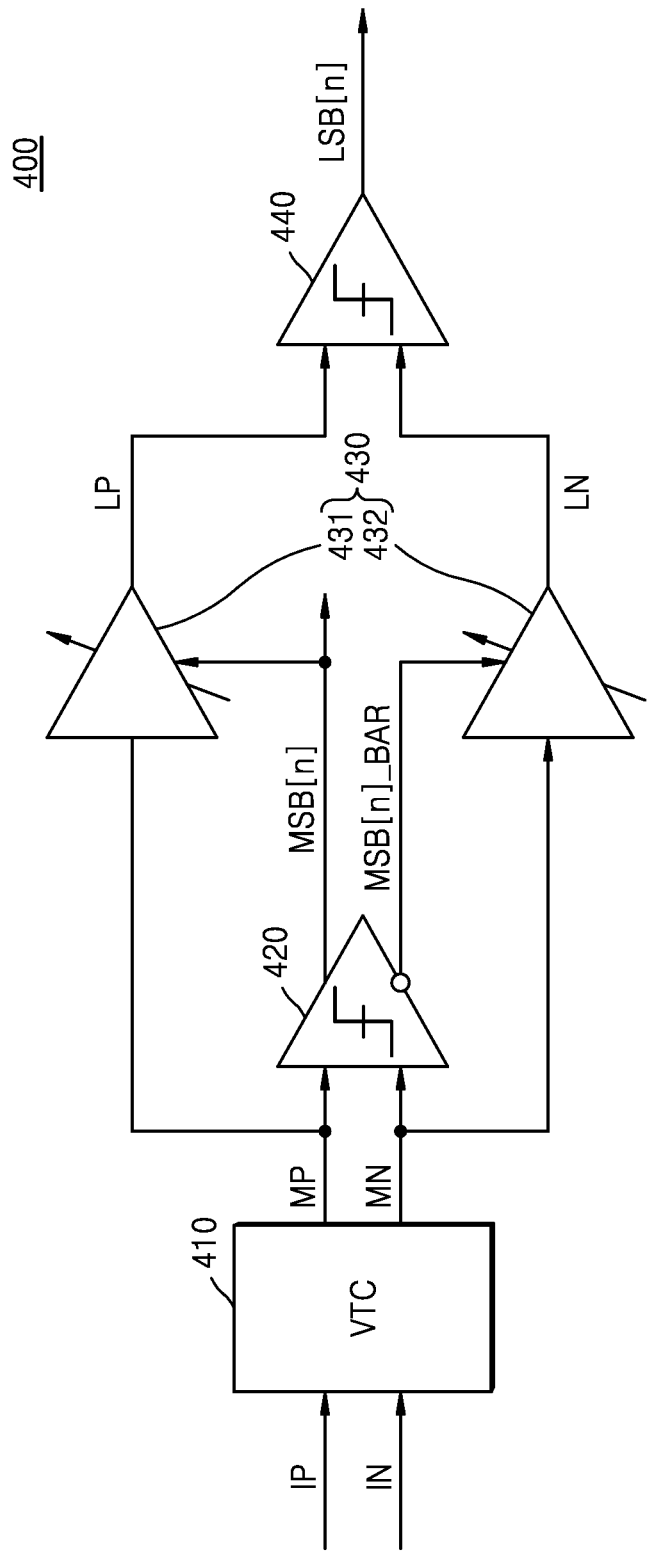
FIG. 4 is a diagram illustrating an example of the receiver of FIG. 3 according to example embodiments of the present disclosure.

FIG. 4 is a diagram illustrating an example of the receiver 300 of FIG. 3 according to example embodiments.

Referring to FIG. 4, a receiver 400 may include a VTC 410, a first time comparator 420, a delay time generator 430, and a second time comparator 440.

In some embodiments, each of a first signal IP and a second signal IN may be a PAM-4 signal and may have one of four different voltage levels during a UI. According to an embodiment, the first signal IP and the second signal IN may respectively correspond to first and second differential signals, which respectively have opposite polarities from each other. For example, the first signal IP may correspond to a positive first differential signal and the second signal IN may correspond to a negative second differential signal. However, embodiments are not limited thereto. The polarity of the first signal IP may be negative and the polarity of the second signal IN may be positive. In some embodiments, one of the first signal IP and the second signal IN may correspond to a single data signal and the other one may correspond to a reference signal. Hereinafter, it is assumed that the first signal IP and the second signal IN are PAM-4 signals and differential signals and respectively have a positive polarity and a negative polarity.

The VTC 410 may convert the first signal IP into a first converted signal MP and the second signal IN into a second converted signal MN. In some embodiments, the VTC 410 may sequentially output the first converted signal MP and the second converted signal MN with a time difference corresponding to a voltage level difference between the first signal IP and the second signal IN. When the voltage level difference increases, the time difference may also increase. When the voltage level difference decreases, the time difference may also decrease. The first converted signal MP and the second converted signal MN may be sequentially input to the first time comparator 420. The first converted signal MP may also be input to a first delay circuit 431 and the second converted signal MN may also be input to a second delay circuit 432.

The first time comparator 420 may determine a first bit value according to a signal (e.g., a first first-arrival signal) that is input first among the first converted signal MP and the second converted signal MN. In some embodiments, the first bit value may correspond to a most significant bit (MSB). For example, when the first first-arrival signal is the first converted signal MP, the value of the MSB may correspond to a first value. When the first first-arrival signal is the second converted signal MN, the value of the MSB may correspond to a second value. The first time comparator 420 may output first data MSB [n] including the currently output MSB.

Flip data MSB [n] _BAR including a flip bit value resulting from a flip of the MSB may be output. In some embodiments, the flip data MSB [n] _BAR may be output by the first time comparator 420. In some embodiments, an inverter may output the flip data MSB [n] _BAR by inverting the MSB of the first data MSB [n].

The first data MSB [n] and the flip data MSB [n] _BAR, as an enable signal for further delaying a signal by a threshold delay time, may be input to the delay time generator 430. In some embodiments, and as shown in FIG. 4, the first data MSB [n] may be input to the first delay circuit 431 and the flip data MSB [n] _BAR may be input to the second delay circuit 432. However, embodiments are not limited thereto. The first data MSB [n] may be input to the second delay circuit 432 and the flip data MSB [n] _BAR may be input to the first delay circuit 431. An operation of further delaying a signal by the threshold delay time according to a logic value of the enable signal may be performed. For example, a delay circuit receiving the first bit value among the first and second delay circuits 431 and 432 may be enabled. However, embodiments are not limited thereto.

The delay time generator 430 may include the first delay circuit 431 and the second delay circuit 432. The first delay circuit 431 may receive the first converted signal MP and the first data MSB [n] and may delay the first converted signal MP. The second delay circuit 432 may receive the second converted signal MN and the flip data MSB [n] _BAR and may delay the second converted signal MN.

In some embodiments, the first delay circuit 431 may select the first converted signal MP as a target signal or a non-target signal according to the value of the MSB. The second delay circuit 432 may select the second converted signal MN as a target signal or a non-target signal according to the flip bit value of the flip data MSB [n] _BAR. For example, when the first converted signal MP corresponds to the target signal, the second converted signal MN may correspond to the non-target signal. The first delay circuit 431 may delay the first converted signal MP more than the second converted signal MN by a threshold delay time and the second delay circuit 432 may delay the second converted signal MN less than the first converted signal MP by the threshold delay time.

In some embodiments, the first delay circuit 431 may determine the magnitude of a first delay time by which the first converted signal MP is delayed according to the value of the MSB. The second delay circuit 432 may determine the magnitude of a second delay time by which the second converted signal MN is delayed according to the flip bit value of the flip data MSB [n] _BAR. For example, when the value of the MSB is the first value (e.g., "1"), the first delay time may correspond to the sum of a default delay time and the threshold delay time and the second delay time may correspond to the default delay time. For example, when the value of the MSB is the second value (e.g., "0"), the first delay time may be less than the second delay time by the threshold delay time. The default delay time may correspond to a preset delay time.

The delay time generator 430 may sequentially output a first delayed signal LP and a second delayed signal LN. Referring to FIG. 4, the first delay circuit 431 may output the first delayed signal LP. The second delay circuit 432 may output the second delayed signal LN. However, embodiments are not limited thereto. The first delay circuit 431 may output the second delayed signal LN and the second delay circuit 432 may output the first delayed signal LP.

The second time comparator 440 may determine a second bit value according to a second first-arrival signal among the first delayed signal LP and the second delayed signal LN. In some embodiments, when the first bit value corresponds to the MSB, the second bit value may correspond to the least significant bit. For example, when the second first-arrival signal is the first delayed signal LP, the value of the LSB may correspond to the first value. When the second first-arrival signal is the second delayed signal LN, the value of the LSB may correspond to the second value. The second time comparator 440 may output second data LSB [n] including the currently output LSB.

Figure 5B:
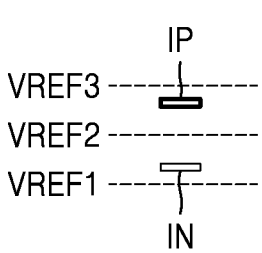

FIGS. 5A and 5B are diagrams illustrating operations of the VTC 410 and the first time comparator 420 in FIG. 4.

Referring to FIGS. 5A and 5B, examples of the voltage level of the first signal IP and the voltage level of the second signal IN are illustrated in TX row in FIGS. 5A and 5B. Examples of the time difference between the first converted signal MP and the second converted signal MN with respect to the voltage level difference between the first and second signals IP and IN are illustrated in VTC row in FIGS. 5A and 5B. Examples of the bit value (e.g., the value of the MSB) of the first data MSB [n] according to the order of the first and second converted signals MP and MN are illustrated in MSB [n] row in the FIGS. 5A and 5B.

Referring to FIGS. 4 and 5A, the VTC 410 may compare a first voltage level of the first signal IP with a second voltage level of the second signal IN. For example, the first voltage level of the first signal IP may be lower than the first reference level VREF1 and the second voltage level of the second signal IN may be higher than the third reference level VREF3. In this case, the VTC 410 may output the second converted signal MN before the first converted signal MP. At this time, the third time difference TD3 between the first converted signal MP and the second converted signal MN may occur. For example, the first voltage level of the first signal IP may be higher than the first reference level VREF1 and lower than the second reference level VREF2 and the second voltage level of the second signal IN may be higher than the second reference level VREF2 and lower than the third reference level VREF3. In this case, the VTC 410 may output the second converted signal MN before the first converted signal MP with the first time difference TD1. The second converted signal MN may correspond to the first first-arrival signal. In this case, the bit value of the first data MSB [n] that is currently output by the first time comparator 420 may be "0".

Referring to FIGS. 4 and 5B, the first voltage level of the first signal IP may be higher than the second reference level VREF2 and lower than the third reference level VREF3 and the second voltage level of the second signal IN may be higher than the first reference level VREF1 and lower than the second reference level VREF2. In this case, the VTC 410 may output the first converted signal MP before the second converted signal MN with the first time difference TD1. In another case, the first voltage level of the first signal IP may be higher than the third reference level VREF3 and the second voltage level of the second signal IN may be lower than the first reference level VREF1. In this case, the VTC 410 may output the first converted signal MP before the second converted signal MN with the third time difference TD3. The first converted signal MP may correspond to the first first-arrival signal. In this case, the bit value of the first data MSB [n] that is currently output by the first time comparator 420 may be "1".

Unlike FIGS. 4, 5A, and 5B, when the first voltage level of the first signal IP is higher than the second voltage level of the second signal IN, the second converted signal MN may be output before the first converted signal MP with a certain time difference and the bit value of the first data MSB [n] may be "1". When the first voltage level of the first signal IP is lower than the second voltage level of the second signal IN, the first converted signal MP may be output before the second converted signal MN with a certain time difference and the bit value of the first data MSB [n] may be "0".

Figure 6A:
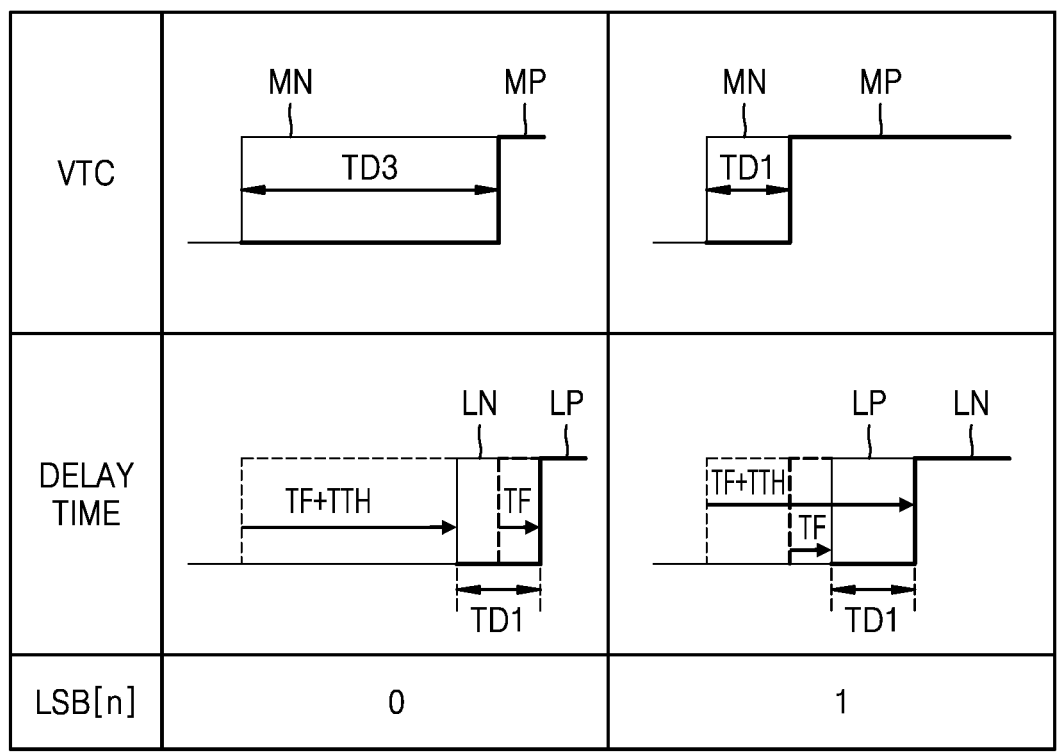
FIGS. 6A and 6B are diagrams illustrating operations of a delay time generator and a second time comparator in FIG. 4.
Figure 6B:
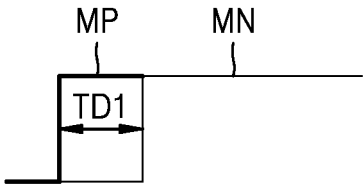

FIGS. 6A and 6B are diagrams illustrating operations of the delay time generator 430 and the second time comparator 440 in FIG. 4.

Referring to FIGS. 6A and 6B, examples of the time difference between the first converted signal MP and the second converted signal MN are illustrated in VTC row in FIGS. 6A and 6B. Examples of the first delayed signal LP and the second delayed signal LN are illustrated in DELAY TIME row in FIGS. 6A and 6B. Examples of the bit value (e.g., the value of the LSB) of the second data LSB [n] according to the order of the first and second delayed signals LP and LN are illustrated in LSB [n] row in the FIGS. 6A and 6B.

Referring to FIGS. 4, 5A, and 6A, the second voltage level of the second signal IN may be higher than the first voltage level of the first signal IP. In this case, the VTC 410 may output the second converted signal MN before the first converted signal MP. The bit value of the first data MSB [n] may be "0".

In some embodiments, the second converted signal MN may correspond to a target signal and the first converted signal MP may correspond to a non-target signal. The first delay circuit 431 may delay the first converted signal MP by a default delay time TF. The second delay circuit 432 may delay the second converted signal MN by the default delay time TF and a threshold delay time TTH.

In some embodiments, a first delay time, which is set by the first delay circuit 431, may be set as the default delay time TF. A second delay time, which is set by the second delay circuit 432, may be set as the sum of the default delay time TF and the threshold delay time TTH. In other words, because the bit value of the first data MSB [n] is "0", the first delay time may be less than the second delay time. For example, the first delay time may be less than the second delay time by the threshold delay time TTH.

The threshold delay time TTH may be greater than the default delay time TF.

When there is the third time difference TD3 between the first converted signal MP and the second converted signal MN, the second delayed signal LN may be input to the second time comparator 440 earlier than the first delayed signal LP. In other words, the second delayed signal LN may correspond to the second first-arrival signal. Accordingly, the bit value of the second data LSB [n] may be "0".

When there is the first time difference TD1 between the first converted signal MP and the second converted signal MN, the first delayed signal LP may be input to the second time comparator 440 earlier than the second delayed signal LN. In other words, the first delayed signal LP may correspond to the second first-arrival signal. Accordingly, the bit value of the second data LSB [n] may be "1".

Referring to FIGS. 4, 5B, and 6B, the first voltage level of the first signal IP may be higher than the second voltage level of the second signal IN. In this case, the VTC 410 may output the first converted signal MP before the second converted signal MN. The bit value of the first data MSB [n] may be "1".

In some embodiments, the first converted signal MP may correspond to a target signal and the second converted signal MN may correspond to a non-target signal. The first delay circuit 431 may delay the first converted signal MP by the default delay time TF and the threshold delay time TTH. The second delay circuit 432 may delay the second converted signal MN by the default delay time TF.

In some embodiments, the first delay time of the first delay circuit 431 may be set as the sum of the default delay time TF and the threshold delay time TTH and the second delay time of the second delay circuit 432 may be set as the default delay time TF. In other words, because the bit value of the first data MSB [n] is "1", the first delay time may be greater than the second delay time. For example, the first delay time may be greater than the second delay time by the threshold delay time TTH.

When there is the first time difference TD1 between the first converted signal MP and the second converted signal MN, the second delayed signal LN may be input to the second time comparator 440 earlier than the first delayed signal LP. In other words, the second delayed signal LN may correspond to the second first-arrival signal. Accordingly, the bit value of the second data LSB [n] may be "0".

When there is the third time difference TD3 between the first converted signal MP and the second converted signal MN, the second delayed signal LN may be input to the second time comparator 440 earlier than the first delayed signal LP. In other words, the first delayed signal LP may correspond to the second first-arrival signal. Accordingly, the bit value of the second data LSB [n] may be "1".

In embodiments, the threshold delay time TTH may be less than a maximum time difference between the first converted signal MP and the second converted signal MN and greater than a minimum time difference between the first converted signal MP and the second converted signal MN. For example, the third time difference TD3 may correspond to the maximum time difference between the first converted signal MP and the second converted signal MN and the first time difference TD1 may correspond to the minimum time difference between the first converted signal MP and the second converted signal MN. According to some embodiments, the time difference between the first delayed signal LP and the second delayed signal LN may be the first time difference TD1 due to the threshold delay time TTH. However, embodiments are not limited thereto.

Figure 7:
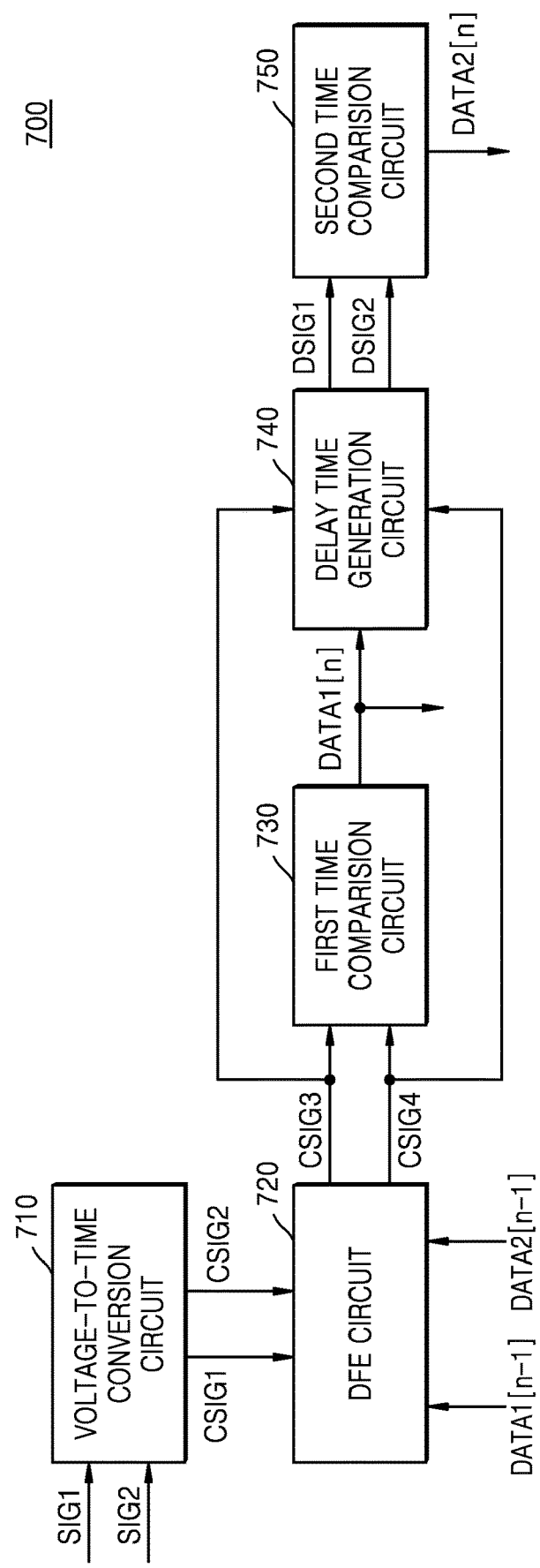
FIG. 7 is a block diagram of a receiver according to some example embodiments of the present disclosure.

FIG. 7 is a block diagram of a receiver according to some example embodiments.

Referring to FIG. 7, a receiver 700 may include a voltage-to-time conversion circuit 710, a decision feedback equalizer (DFE) circuit 720, a first time comparison circuit 730, a delay time generation circuit 740, and a second time comparison circuit 750.

The voltage-to-time conversion circuit 710 and the second time comparison circuit 750 may be respectively the same as the voltage-to-time conversion circuit 310 and the second time comparison circuit 340 in FIG. 3.

The DFE circuit 720, as a non-linear equalizer, may cancel or reduce ISI with respect to currently sampled data by using previously sampled data. In other words, the DFE circuit 720 may restore a distorted signal to an original shape. In some embodiments, the DFE circuit 720 may output a third converted signal CSIG3 and a fourth converted signal CSIG4 in response to a clock signal.

The DFE circuit 720 may receive the first converted signal CSIG1, the second converted signal CSIG2, previous first data DATA1 [n-1], and previous second data DATA2 [n-1]. The DFE circuit 720 may adjust a time difference between converted signals, based on the bit value of the previous first data DATA1 [n-1] and the bit value of the previous second data DATA2 [n-1]. The DFE circuit 720 may sequentially output the third converted signal CSIG3 and the fourth converted signal CSIG4 with the adjusted time difference.

The first time comparison circuit 730 may determine the bit value of current first data DATA1 [n] according to a first first-arrival signal among the third converted signal CSIG3 and the fourth converted signal CSIG4 and may output the current first data DATA1 [n]. The operation of the first time comparison circuit 730 may be the same as that of the first time comparison circuit 320 in FIG. 3.

The delay time generation circuit 740 may receive the third converted signal CSIG3, the fourth converted signal CSIG4, and the current first data DATA1 [n]. The delay time generation circuit 740 may identify the first first-arrival signal among the third converted signal CSIG3 and the fourth converted signal CSIG4 according to the bit value of the current first data DATA1 [n]. The delay time generation circuit 740 may delay the first first-arrival signal among the third converted signal CSIG3 and the fourth converted signal CSIG4 by the default delay time TF and the threshold delay time TTH and may delay the other one of the third converted signal CSIG3 and the fourth converted signal CSIG4 by the default delay time TF. The delay time generation circuit 740 may output a first delayed signal DSIG1 and a second delayed signal DSIG2. The operation of the delay time generation circuit 740 may be the same as that of the delay time generation circuit 330 in FIG. 3. The second time comparison circuit 750 may determine the bit value of current second data DATA2 [n] according to the second first-arrival signal among the first delayed signal DSIG1 and the second delayed signal DSIG2 and may output the current second data DATA2 [n].

According to the descriptions above, when the receiver 700 further includes the DFE circuit 720, the accuracy of a decoding operation performed by the receiver 700 and the signal integrity (SI), power integrity (PI) and BER of the receiver 700 may increase.

Figure 8:
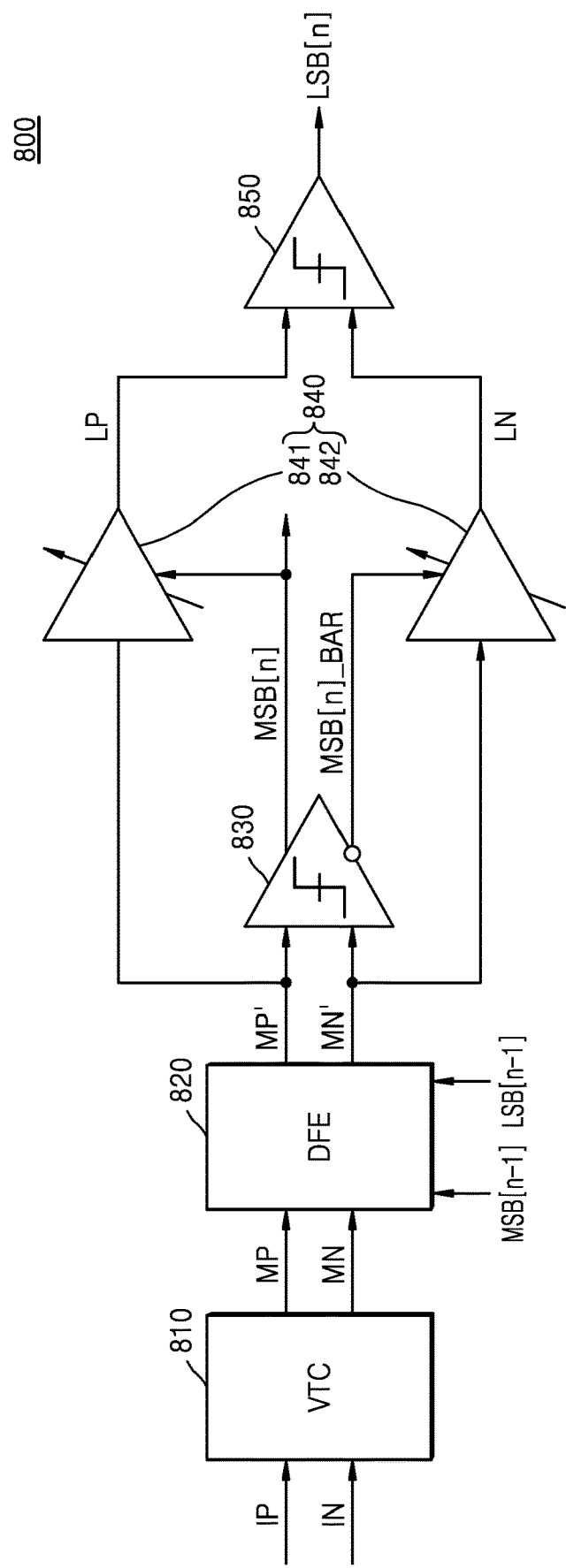
FIG. 8 is a diagram illustrating an example of the receiver of FIG. 7 according to example embodiments of the present disclosure.

FIG. 8 is a diagram illustrating an example of the receiver 700 of FIG. 7 according to example embodiments.

Referring to FIG. 8, a receiver 800 may include a VTC 810, a DFE 820, a first time comparator 830, a delay time generator 840, and a second time comparator 850. Some of the descriptions of the receiver 800 are the same as those of the receiver 400 of FIG. 4, and thus, redundant descriptions thereof are omitted below.

The DFE 820 may receive the first converted signal MP, the second converted signal MN, previous first data MSB [n−1], and previous second data LSB [n−1]. The DFE 820 may adjust the time difference between the first and second converted signals MP and MN according to the value of a previous MSB and the value of a previous LSB. The DFE 820 may sequentially output a third converted signal MP' and a fourth converted signal MN' with the adjusted time difference.

The first time comparator 830 may receive the third converted signal MP' and the fourth converted signal MN' instead of the first converted signal MP and the second converted signal MN.

The delay time generator 840 may include a first delay circuit 841 and a second delay circuit 842. The first delay circuit 841 may receive the third converted signal MP' instead of the first converted signal MP. The second delay circuit 842 may receive the fourth converted signal MN' instead of the second converted signal MN.

FIGS. 9A to 9D are diagrams illustrating operations of the DFE 820 in FIG. 8.

Referring to FIGS. 9A to 9D, examples of two bits of a previous PAM-4 signal are illustrated in "n−1th 2-BIT DATA" row. Examples of two bits of a current PAM-4 are illustrated in "nth 2-BIT DATA" row. In "nth 2-BIT DATA" row, "0X" may indicate that the MSB of the current PAM-4 signal is "0" and "1×" may indicate that the MSB of the current PAM-4 signal is "1". Examples of a time difference requested or necessary to output the value of a current MSB are illustrated in "VTC (REQUESTED)" row. Examples of a time difference influenced by the two bits of the previous PAM-4 signal are illustrated in "VTC (ACTUAL)" row. Examples of a time difference adjusted according to the two bits of the previous PAM-4 signal are illustrated in "DFE" row.

Figure 9A:
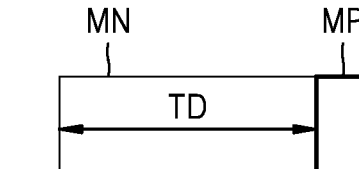
FIGS. 9A, 9B, 9C, and 9D are diagrams illustrating operations of a decision feedback equalizer in FIG. 8.
Figure 9A:
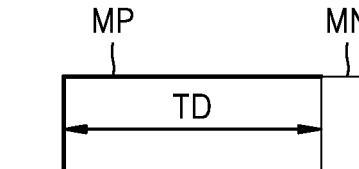
Figure 9A:
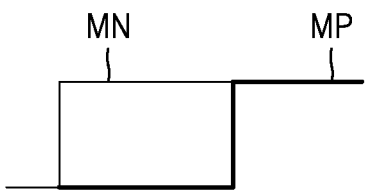
Figure 9A:
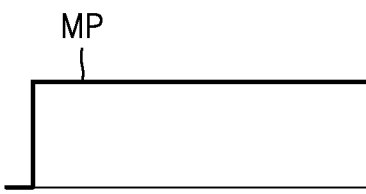
Figure 9A:
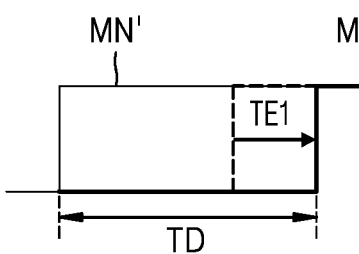
Figure 9A:
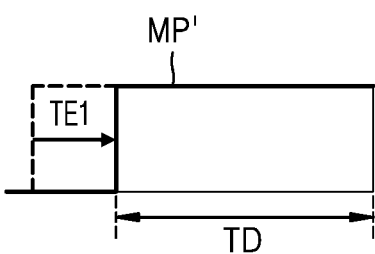

Referring to FIGS. 2A, 8, and 9A, when the symbol of the previous PAM-4 signal is "11", the first to third eye characteristics of the current PAM-4 signal may be changed. Referring to "VTC (ACTUAL)" row in FIG. 9A, when the MSB of the current PAM-4 signal is "0" (e.g., "0X"), an actual time difference may be less than a requested time difference TD. When the MSB of the current PAM-4 signal is "1" (e.g., "1×"), the actual time difference may be greater than the requested time difference TD. The DFE 820 may delay a particular converted signal (e.g., the first converted signal MP) by a first adjusted delay time TE1. Due to the DFE 820, the time difference between the third converted signal MP' and the fourth converted signal MN' may be the same as the requested time difference TD.

Figure 9B:
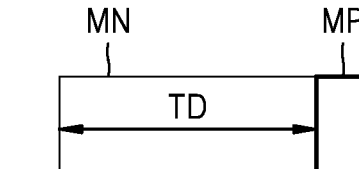
Figure 9B:
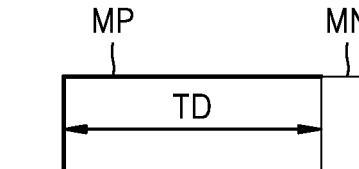
Figure 9B:
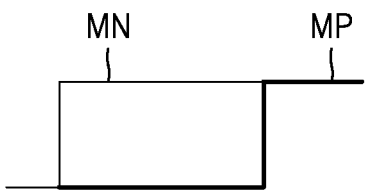
Figure 9B:
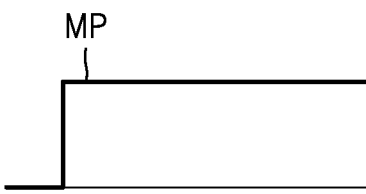
Figure 9B:
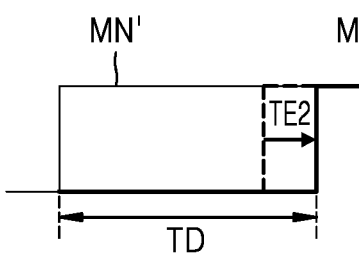
Figure 9B:
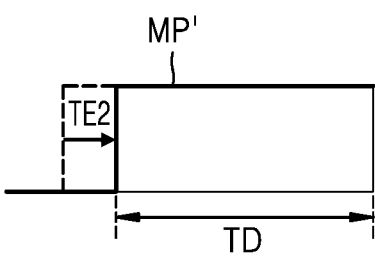

Referring to FIGS. 2A, 8, and 9B, when the symbol of the previous PAM-4 signal is "10", the second and third eye characteristics of the current PAM-4 signal may be changed. Referring to "VTC (ACTUAL)" row in FIG. 9B, when the MSB of the current PAM-4 signal is "0" (e.g., "0X"), the actual time difference may be less than the requested time difference TD. When the MSB of the current PAM-4 signal is "1" (e.g., "1×"), the actual time difference may be greater than the requested time difference TD. The DFE 820 may delay a particular converted signal (e.g., the first converted signal MP) by a second adjusted delay time TE2. Due to the DFE 820, the time difference between the third converted signal MP' and the fourth converted signal MN' may be the same as the requested time difference TD.

Figure 9C:
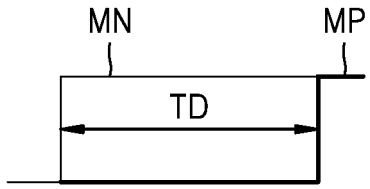
Figure 9C:
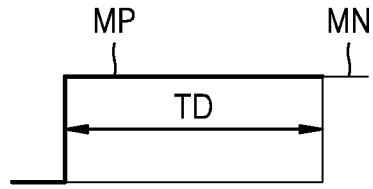
Figure 9C:
Figure 9C:
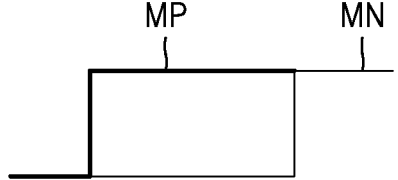
Figure 9C:
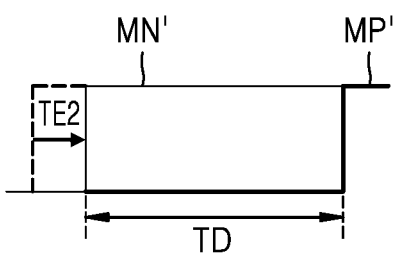
Figure 9C:
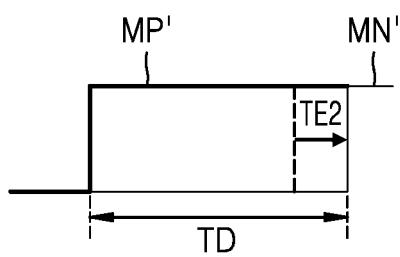

Referring to FIGS. 2A, 8, and 9C, when the symbol of the previous PAM-4 signal is "01", the first and second eye characteristics of the current PAM-4 signal may be changed. Referring to "VTC (ACTUAL)" row in FIG. 9C, when the MSB of the current PAM-4 signal is "O" (e.g., "0X"), the actual time difference may be greater than the requested time difference TD. When the MSB of the current PAM-4 signal is "1" (e.g., "1×"), the actual time difference may be less than the requested time difference TD. The DFE 820 may delay a particular converted signal (e.g., the second converted signal MN) by the second adjusted delay time TE2. Due to the DFE 820, the time difference between the third converted signal MP' and the fourth converted signal MN' may be the same as the requested time difference TD.

Figure 9D:
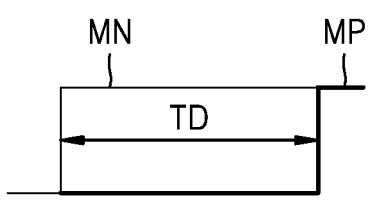
Figure 9D:
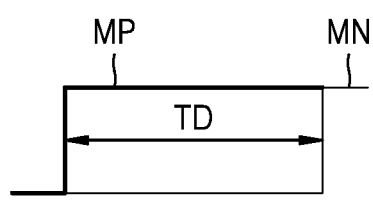
Figure 9D:
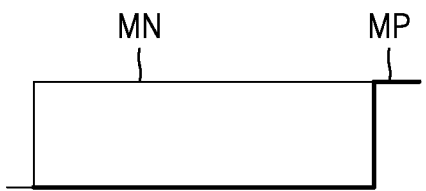
Figure 9D:
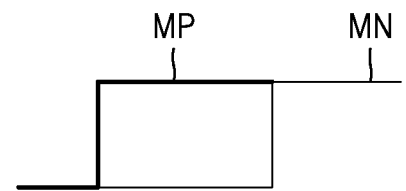
Figure 9D:
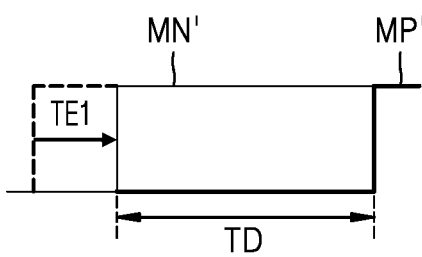
Figure 9D:
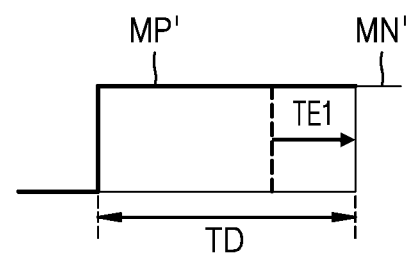

Referring to FIGS. 2A, 8, and 9D, when the symbol of the previous PAM-4 signal is "00", the first and third eye characteristics of the current PAM-4 signal may be changed. Referring to "VTC (ACTUAL)" row in FIG. 9D, when the MSB of the current PAM-4 signal is "0" (e.g., "0X"), the actual time difference may be greater than the requested time difference TD. When the MSB of the current PAM-4 signal is "1" (e.g., "1×"), the actual time difference may be less than the requested time difference TD. The DFE 820 may delay a particular converted signal (e.g., the second converted signal MN) by the first adjusted delay time TE1. Due to the DFE 820, the time difference between the third converted signal MP' and the fourth converted signal MN' may be the same as the requested time difference TD.

In some embodiments, the second adjusted delay time TE2 may be less than the first adjusted delay time TE1.

According to the descriptions above, when the receiver 800 further includes the DFE 820, the accuracy of a decoding operation performed by the receiver 800 may increase.

Figure 10:
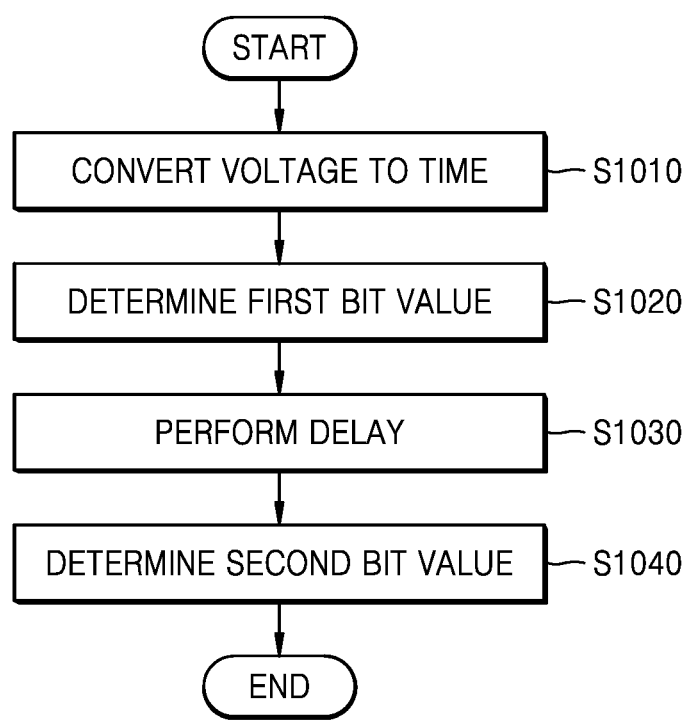
FIG. 10 is a flowchart of an operation method of a receiver according to embodiments of the present disclosure.

FIG. 10 is a flowchart of an operation method of a receiver according to embodiments.

Referring to FIGS. 1, 3, and 10, the operation method of the receiver 300 may include operation S1010, operation S1020, operation S1030, and operation S1040.

In operation S1010, the receiver 300 may determine a time difference corresponding to a voltage level difference between the first signal SIG1 and the second signal SIG2. The time difference may be based on the first and second signals SIG1 and SIG2, and the receiver 300 may output the first converted signal CSIG1 and the second converted signal CSIG2, which have the time difference therebetween.

In some embodiments, operation S1010 may include comparing the first voltage level of the first signal SIG1 with the second voltage level of the second signal SIG2, determining the time difference proportional to the difference between the first voltage level and the second voltage level, and sequentially outputting the first converted signal CSIG1 and the second converted signal CSIG2 with the time difference. According to some embodiments, operation S1010 may be performed by the voltage-to-time conversion circuit 310.

In an embodiment, the first signal SIG1 may correspond to a first differential signal and the second signal SIG2 may correspond to a second differential signal. The first and second differential signals may respectively have opposite polarities.

In operation S1020, the receiver 300 may determine the first bit value according to a first first-arrival signal among the first and second converted signals CSIG1 and CSIG2 and output the first data DATA1 including the first bit value.

In operation S1030, the receiver 300 may determine a magnitude relationship between a first delay time and a second delay time according to the first bit value of the first data DATA1, and output the first delayed signal DSIG1 and the second delayed signal DSIG2. At this time, the first delayed signal DSIG1 may result from delaying the first converted signal CSIG1 by the first delay time. The second delayed signal DSIG2 may result from delaying the second converted signal CSIG2 by the second delay time.

In some embodiments, when the first bit value corresponds to a first value (e.g., "1"), the first delay time may be greater than the second delay time by the threshold delay time TTH. When the first bit value corresponds to a second value (e.g., "0") that is different from the first value, the first delay time may be less than the second delay time by the threshold delay time TTH.

In an embodiment, the first bit value may correspond to the MSB and the second bit value may correspond to the LSB.

In an embodiment, the threshold delay time TTH may be less than the maximum time difference (e.g., the third time difference TD3) between the first and second converted signals CSIG1 and CSIG2 and greater than the minimum time difference (e.g., the first time difference TD1) between the first and second converted signals CSIG1 and CSIG2.

In operation S1040, the receiver 300 may determine the second bit value according to a second first-arrival signal among the first and second delayed signals DSIG1 and DSIG2, and may output the second data DATA2 including the second bit value.

According to the descriptions above, the power consumption, integration and manufacturing cost of devices may be improved.

Figure 11:
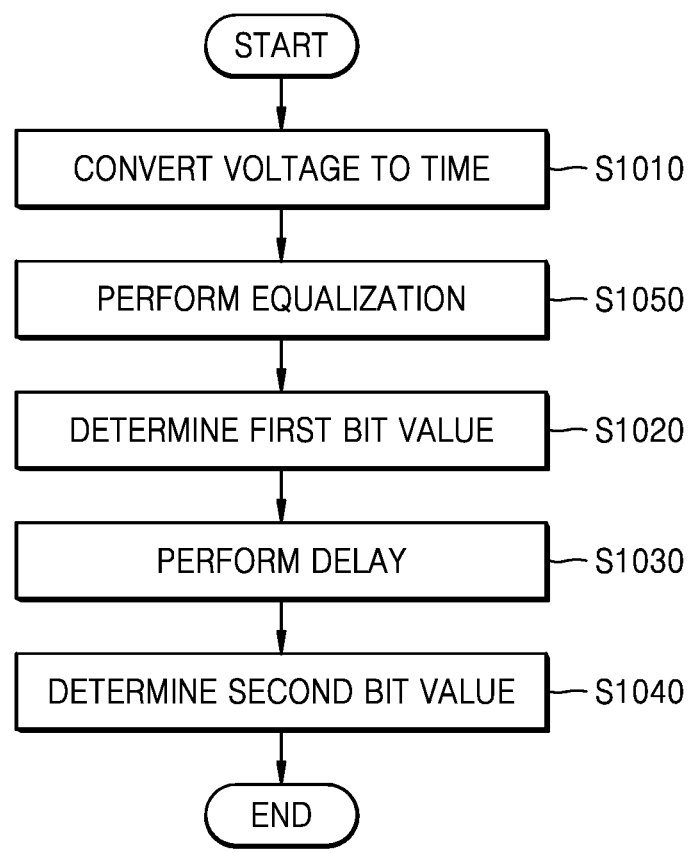
FIG. 11 is a flowchart of a specific example of the operation method of FIG. 10.
Figure 12:
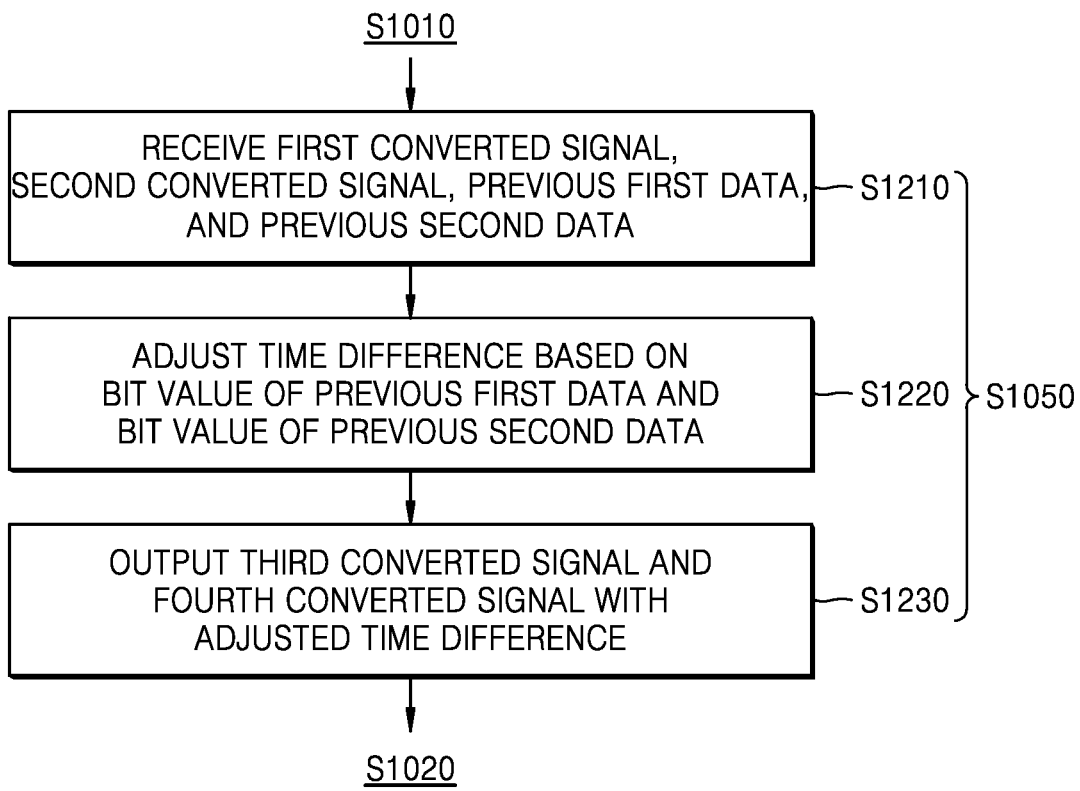
FIG. 12 is a detailed flowchart of an equalizing operation in FIG. 11.

FIG. 11 is a flowchart of a specific example of the operation method of FIG. 10. FIG. 12 is a detailed flowchart of operation S1050 in FIG. 11.

Referring to FIGS. 7 and 11, an operation method of FIG. 11 may include operations S1010, 1020, S1030, and S1040 in the operation method of FIG. 10 and may further include operation S1050.

In operation S1050, the receiver 700 may equalize a particular converted signal.

Referring to FIG. 12, for example, operation S1050 may include receiving a first converted signal, a second converted signal, previous first data, and previous second data in operation S1210, adjusting a time difference based on a bit value of the previous first data and a bit value of the previous second data in operation S1220, and outputting a third converted signal and a fourth converted signal with an adjusted time difference in operation S1230. Operations S1210, S1220, and S1230 in FIG. 12 may be performed by the DFE 820 in FIG. 8.

Figure 13:
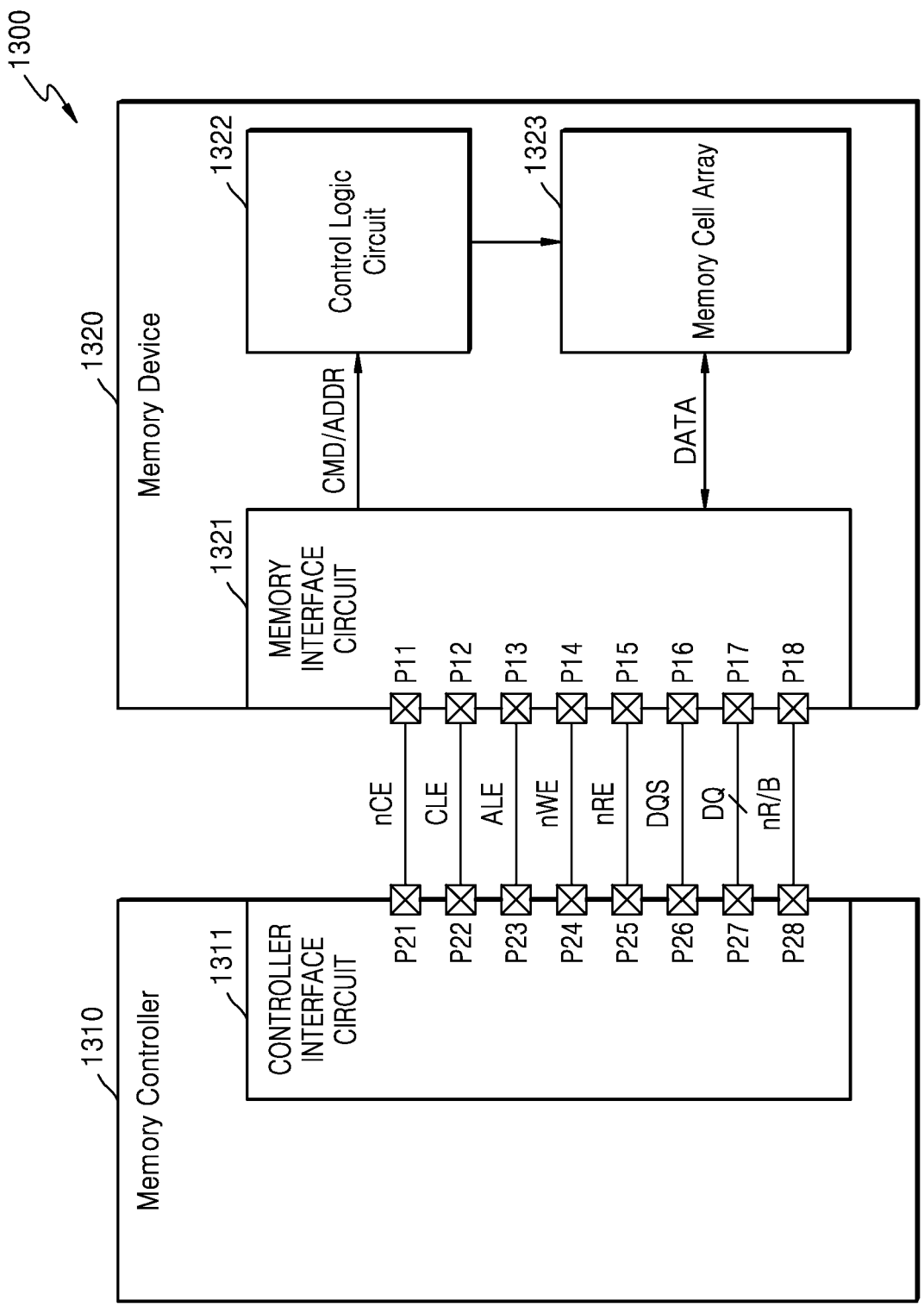
FIG. 13 is a block diagram of a memory system according to embodiments of the present disclosure.

FIG. 13 is a block diagram of a memory system according to embodiments.

Referring to FIG. 13, a memory system 1300 may include a memory controller 1310 and a memory device 1320.

The memory device 1300 may include first to eighth pins P11 to P18, a memory interface circuit 1321, a control logic circuit 1322, and a memory cell array 1323.

The memory interface circuit 1321 may receive a chip enable signal nCE from the memory controller 1310 through the first pin P11. The memory interface circuit 1321 may exchange signals with the memory controller 1310 through the second to eighth pins P12 through P18 according to the chip enable signal nCE. For example, when the chip enable signal nCE is enabled (e.g., at a low level), the memory interface circuit 1321 may exchange signals with the memory controller 1310 through the second to eighth pins P12 to P18 according to the chip enable signal nCE.

The memory interface circuit 1321 may receive a command latch enable signal CLE, an address latch enable signal ALE, and a write enable signal nWE from the memory controller 1310 through the second to fourth pins P12 to P14, respectively. The memory interface circuit 1321 may receive or transmit a data input/output (I/O) signal DQ from or to the memory controller 1310 through the seventh pin P17. A command CMD, an address ADDR, and data DATA may be transmitted through the data I/O signal DQ. For example, the data I/O signal DQ may be transmitted through a plurality of signal lines. In this case, the seventh pin P17 may include a plurality of pins respectively corresponding to the signal lines.

The data I/O signal DQ may be referred to as a data signal. In some embodiments, the data I/O signal DQ may include a first data signal and a second data signal. The first and second data signals may respectively correspond to the signals SIG and SIG' in FIG. 1, the first and second signals SIG1 and SIG2 in FIG. 3, or the first and second signals IP and IN in FIG. 4 or 8.

The memory interface circuit 1321 may acquire the command CMD from the data I/O signal DQ, which is received in an enable period (e.g., a high level state) of the command latch enable signal CLE, based on toggle timings of the write enable signal nWE. The memory interface circuit 1321 may acquire the address ADDR from the data I/O signal DQ, which is received in an enable period (e.g., a high level state) of the address latch enable signal ALE, based on the toggle timings of the write enable signal nWE.

In an embodiment, the write enable signal nWE may remain in a toggle-off state (e.g., a high level or a low level) and may toggle between the high level and the low level. For example, the write enable signal nWE may toggle in a period in which the command CMD or the address ADDR is transmitted. Accordingly, the memory interface circuit 1321 may acquire the command CMD or the address ADDR, based on the toggle timings of the write enable signal nWE.

The memory interface circuit 1321 may receive a read enable signal nRE from the memory controller 3100 through the fifth pin P15. The memory interface circuit 1321 may receive or transmit a data strobe signal DQS from or to the memory controller 1310 through the sixth pin P16.

In a data output operation of the memory device 1320, the memory interface circuit 1321 may receive the read enable signal nRE, which toggles, through the fifth pin P15 before outputting the data DATA. The memory interface circuit 1321 may generate the data strobe signal DQS, which toggles, in response to toggling of the read enable signal nRE. The memory interface circuit 1321 may transmit the data I/O signal DQ including the data DATA, based on toggle timings of the data strobe signal DQS. Accordingly, the data DATA may be transmitted to the memory controller 1310 in alignment with the toggle timings of the data strobe signal DQS.

In a data input operation of the memory device 1320, when the data I/O signal DQ including the data DATA is received from the memory controller 1310, the memory interface circuit 1321 may receive the data strobe signal DQS, which toggles, from the memory controller 1310 together with the data DATA. The memory interface circuit 1321 may acquire the data DATA from the data I/O signal DQ, based on the toggle timings of the data strobe signal DQS. For example, the memory interface circuit 1321 may acquire the data DATA by sampling the data I/O signal DQ at rising and falling edges of the data strobe signal DQS.

The memory interface circuit 1321 may transmit a ready/busy output signal nR/B to the memory controller 1310 through the eighth pin P18. The memory interface circuit 1321 may transmit state information of the memory device 1320 to the memory controller 1310 through the ready/busy output signal nR/B. When the memory device 1320 is in a busy state (that is, when internal operations of the memory device 1320 are being performed), the memory interface circuit 1321 may transmit the ready/busy output signal nR/B indicating the busy state to the memory controller 1310. When the memory device 1320 is in a ready state (that is, when internal operations of the memory device 1320 are not performed or are completed), the memory interface circuit 1321 may transmit the ready/busy output signal nR/B indicating the ready state to the memory controller 1310.

In some embodiments, the memory interface circuit 1321 may include the voltage-to-time conversion circuit 310, the first time comparison circuit 320, the delay time generation circuit 330, and the second time comparison circuit 340. The memory interface circuit 1321 may further include the DFE 820.

The control logic circuit 1322 may generally control various operations of the memory device 1320. The control logic circuit 1322 may perform a control operation based on the data I/O signal DQ provided from the memory interface circuit 1321. The control logic circuit 1322 may generate control signals for controlling other elements of the memory device 1320 according to the command CMD and/or the address ADDR received from the memory interface circuit 1321. For example, the control logic circuit 1322 may generate various control signals for programming the data DATA to the memory cell array 1323 or reading the data DATA from the memory cell array 1323.

The memory cell array 1323 may store the data DATA from the memory interface circuit 1321 under control by the control logic circuit 1322. The memory cell array 1323 may output the data DATA, which has been stored therein, to the memory interface circuit 1321 under control by the control logic circuit 1322.

The memory cell array 1323 may include a plurality of memory cells. The memory cells may include resistive random access memory (RRAM) cells, ferroelectric RAM (FRAM) cells, phase-change RAM (PRAM) cells, thyristor RAM (TRAM) cells, magnetic RAM (MRAM) cells, dynamic RAM (DRAM) cells, or flash memory cells.

The memory controller 1310 may include first to eighth pins P21 to P28 and a controller interface circuit 1311. The first to eighth pins P21 to P28 may respectively correspond to the first to eighth pins P11 to P18 of the memory device 1320.

The controller interface circuit 1311 may transmit the chip enable signal nCE to the memory device 1320 through the first pin P21. The controller interface circuit 1311 may exchange signals with the memory device 1320 through the second to eighth pins P22 to P28 according to the chip enable signal nCE.

The controller interface circuit 1311 may transmit the command latch enable signal CLE, the address latch enable signal ALE, and the write enable signal nWE to the memory device 1320 through the second to fourth pins P22 to P24, respectively. The controller interface circuit 1311 may transmit or receive the data signal DQ to or from the memory device 1320 through the seventh pin P27.

The controller interface circuit 1311 may transmit the data I/O signal DQ, which includes the command CMD or the address ADDR, to the memory device 1320 together with the write enable signal nWE, which toggles. The controller interface circuit 1311 may transmit the data I/O signal DQ including the command CMD to the memory device 1320 by transmitting the command latch enable signal CLE, which is in the enable state, and transmit the data I/O signal DQ including the address ADDR to the memory device 1320 by transmitting the address latch enable signal ALE, which is in the enable state.

The controller interface circuit 1311 may transmit the read enable signal nRE to the memory device 1320 through the fifth pin P25. The controller interface circuit 1311 may receive or transmit the data strobe signal DQS from or to the memory device 1320 through the sixth pin P26.

In a data output operation of the memory device 1320, the controller interface circuit 1311 may generate and transmit the read enable signal nRE, which toggles, to the memory device 1320. For example, before the output of the data DATA, the controller interface circuit 1311 may generate the read enable signal nRE, which is converted from a toggle-off state (e.g., a high level or a low level) into a toggling state. Accordingly, the memory device 1320 may generate the data strobe signal DQS, which toggles, in response to the read enable signal nRE. The controller interface circuit 1311 may receive the data I/O signal DQ including the data DATA and the data strobe signal DQS, which toggles, from the memory device 1320. The controller interface circuit 1311 may acquire the data DATA from the data I/O signal DQ, based on the toggle timings of the data strobe signal DQS.

In a data input operation of the memory device 1320, the controller interface circuit 1311 may generate the data strobe signal DQS, which toggles. For example, before transmitting the data DATA, the controller interface circuit 1311 may generate the data strobe signal DQS, which is converted from a toggle-off state (e.g., a high level or a low level) into a toggling state. The controller interface circuit 1311 may transmit the data I/O signal DQ including the data DATA to the memory device 1320, based on the toggle timings of the data strobe signal DQS.

The controller interface circuit 1311 may receive the ready/busy output signal nR/B from the memory device 1320 through the eighth pin P28. The controller interface circuit 1311 may determine state information of the memory device 1320, based on the ready/busy output signal nR/B.

Figure 14:
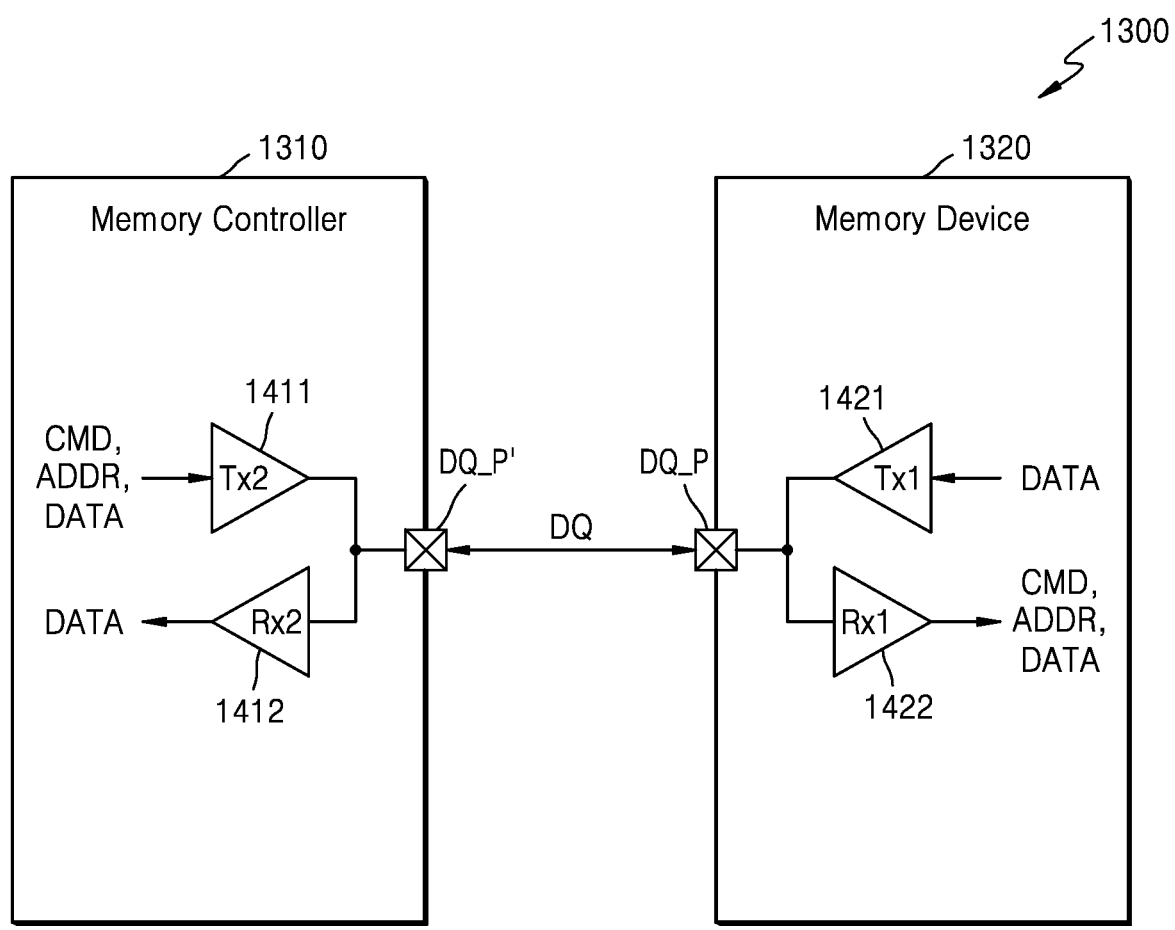
FIG. 14 is a diagram illustrating communication in the memory system of FIG. 13.

FIG. 14 is a diagram illustrating communication in the memory system 1300 of FIG. 13.

Referring to FIG. 14, the memory device 1320 may include a DQ pin DQ_P, a first transmitter 1421 (or a first transmitter Tx1), and a first receiver 1422 (or a first receiver Rx1). The DQ pin DQ_P may correspond to the seventh pin P17 in FIG. 13. For example, when the seventh pin P17 includes a plurality of pins, the DQ pin DQ_P may correspond to one of the pins of the seventh pin P17.

The first transmitter 1421 may generate the data I/O signal DQ based on the data DATA and may transmit the data I/O signal DQ to the memory controller 1310 through the DQ pin DQ_P. The first transmitter 1421 may generate the data I/O signal DQ by using a PAM-N method. For example, the first transmitter 1421 may use one of PAM-4, PAM-8 and PAM-16 methods.

The first receiver 1422 may receive the data I/O signal DQ from the memory controller 1310 through the DQ pin DQ_P and may obtain the command CMD, the address ADDR, or the data DATA from the data I/O signal DQ. In an embodiment, the first receiver 1422 may obtain the command CMD, the address ADDR, or the data DATA by sampling the data I/O signal DQ in PAM-N mode. For example, in the PAM-N mode, the first receiver 1422 may output a plurality of bits based on the voltage level of the data I/O signal DQ that is received during a UI.

The memory controller 1310 may include a DQ pin DQ_P', a second transmitter 1411 (or a second transmitter Tx2), and a second receiver 1412 (or a second receiver Rx2). The DQ pin DQ_P' may correspond to the DQ pin DQ_P of the memory device 1320. When the seventh pin P17 in FIG. 13 includes a plurality of pins, the DQ pin DQ_P' may correspond to one of the pins of the seventh pin P17.

The second transmitter 1411 may generate the data I/O signal DQ based on the command CMD, the address ADDR, and the data DATA and may transmit the data I/O signal DQ to the memory device 1320 through the DQ pin DQ_P'. In an embodiment, the second transmitter 1411 may generate the data I/O signal DQ in the PAM-N mode, based on the command CMD, the address ADDR, and the data DATA.

The second receiver 1412 may receive the data I/O signal DQ from the memory device 1320 through the DQ pin DQ_P' and may obtain the data DATA from the data I/O signal DQ.

In an embodiment, a method of modulating the data I/O signal DQ may be determined according to a predefined protocol. In this case, the mode of the first receiver 1422 and the second receiver 1412, which sample the data I/O signal DQ, may be determined according to a protocol, which is predefined to correspond to the modulation method of the first transmitter 1421 and the second transmitter 1411. In some embodiments, the memory controller 1310 may transmit, to the memory device 1320, signaling information with respect to a modulation method for the data I/O signal DQ. The memory device 1320 may determine the modulation method of the first transmitter 1421 and the mode of the first receiver 1422, based on the signaling information received from the memory controller 1310.

In embodiments, the first receiver 1422 and the second receiver 1412 may correspond to the receiver 130 in FIG. 1. The first receiver 1422 and the second receiver 1412 may be embodied as a time-based receiver.

It is obvious to those of skilled in the art that various changes and modifications may be made in the embodiments described above without departing from the spirit and scope of the present disclosure. In view of the foregoing, it is considered that the embodiments include the changes and the modifications provided that the changes and the modifications fall within the scope of the following claims and equivalents.

While the present disclosure has been particularly shown and described with reference to embodiments thereof, it will be understood that various changes in form and details may be made therein without departing from the spirit and scope of the following claims.

What is claimed is:

1. A receiver comprising:
   a voltage-to-time converter configured to sequentially output a first converted signal and a second converted signal based on a first signal, a second signal, and a time difference, wherein the time difference is based on a difference between a first voltage level of the first signal and a second voltage level of the second signal;
   a first time comparator configured to determine a first bit value based on a first first-arrival signal (FAS) and output first data comprising the first bit value, wherein the first FAS comprises one of the first converted signal and the second converted signal;
   a delay time generator configured to select a non-target signal and a target signal based on the first bit value, wherein the non-target signal and the target signal are selected from among the first converted signal and the second converted signal, wherein the delay time generator is configured to output a first delayed signal by delaying the target signal by a threshold delay time with respect to the non-target signal, wherein the delay time generator is configured to output a second delayed signal by delaying the non-target signal; and
   a second time comparator configured to determine a second bit value based on a second FAS and output second data comprising the second bit value, wherein the second FAS comprises one of the first delayed signal and the second delayed signal.

2. The receiver of claim 1, wherein the voltage-to-time converter is further configured to:
   compare the first voltage level of the first signal with the second voltage level of the second signal,
   output the first converted signal before the second converted signal when the first voltage level is higher than the second voltage level, and
   output the second converted signal before the first converted signal when the first voltage level is lower than the second voltage level.

3. The receiver of claim 1, wherein the delay time generator comprises:
   a first delay circuit configured to receive the first converted signal and the first data, select the first converted signal as the target signal based on the first bit value, and delay the first converted signal; and
   a second delay circuit configured to receive the second converted signal and flip data, select the second converted signal as the target signal based on the flip data, and delay the second converted signal, wherein the flip data comprises a flip bit value that is generated by an inversion operation of the first bit value.

4. The receiver of claim 3, wherein:
   the first delay circuit is further configured to output the first delayed signal by delaying the first converted signal by a sum of a preset delay time and the threshold delay time when the first bit value corresponds to a first value,
   the first delay circuit is further configured to output the second delayed signal by delaying the first converted signal by the preset delay time when the first bit value corresponds to a second value,
   the second delay circuit is further configured to output the second delayed signal by delaying the second converted signal by the preset delay time when the flip bit value corresponds to the second value, and the second delay circuit is further configured to output the first delayed signal by delaying the second converted signal by the sum of the preset delay time and the threshold delay time when the flip bit value corresponds to the first value.

5. The receiver of claim 1, wherein the threshold delay time is less than a maximum time difference between the first converted signal and the second converted signal and greater than a minimum time difference between the first converted signal and the second converted signal.

6. The receiver of claim 1, further comprising a decision feedback equalizer configured to:
receive the first converted signal, the second converted signal, previous first data, and previous second data,
adjust the time difference based on a bit value of the previous first data and a bit value of the previous second data, and
output a third converted signal and a fourth converted signal to each of the first time comparator and the delay time generator, the third converted signal and the fourth converted signal comprising the adjusted time difference.

7. The receiver of claim 1, wherein:
each of the first signal and the second signal corresponds to a four-level pulse amplitude modulation (PAM-4) signal and has one voltage level among four different voltage levels during a unit interval,
the receiver is a time-based receiver,
the first bit value corresponds to a most significant bit (MSB), and
the second bit value corresponds to a least significant bit (LSB).

8. The receiver of claim 1, wherein:
the first signal corresponds to a first differential signal, and
the second signal corresponds to a second differential signal comprising a polarity that is opposite to a polarity of the first differential signal.

9. An operation method of a receiver, the operation method comprising:
determining a time difference based on a difference between a first voltage level of a first signal and a second voltage level of a second signal;
outputting a first converted signal and a second converted signal based on the time difference;
selecting one of the first converted signal and the second converted signal as a first first-arrival signal (FAS) output;
determining a first bit value based on the first FAS output;
outputting first data comprising the first bit value;
determining a magnitude relationship between a first delay time and a second delay time based on the first bit value;
outputting a first delayed signal and a second delayed signal based on the magnitude relationship;
selecting one of the first delayed signal and the second delayed signal as a second FAS output;
determining a second bit value based on the second FAS output; and
outputting second data comprising the second bit value.

10. The operation method of claim 9, wherein the determining of the time difference and the outputting of the first converted signal and the second converted signal comprises:
comparing the first voltage level of the first signal with the second voltage level of the second signal;
determining the time difference, wherein the time difference is proportional to a difference between the first voltage level and the second voltage level; and
sequentially outputting the first converted signal and the second converted signal based on the time difference.

11. The operation method of claim 9, wherein:
the first delay time is greater than the second delay time by a threshold delay time when the first bit value corresponds to a first value, and
the first delay time is less than the second delay time by the threshold delay time when the first bit value corresponds to a second value that is different from the first value.

12. The operation method of claim 11, wherein the threshold delay time is less than a maximum time difference between the first converted signal and the second converted signal and greater than a minimum time difference between the first converted signal and the second converted signal.

13. The operation method of claim 9, further comprising equalizing a converted signal, wherein the equalizing of the converted signal comprises:
receiving the first converted signal, the second converted signal, previous first data, and previous second data;
adjusting the time difference based on a bit value of the previous first data and a bit value of the previous second data; and
outputting a third converted signal and a fourth converted signal based on the adjusted time difference.

14. The operation method of claim 9, wherein the first bit value corresponds to a most significant bit (MSB), and the second bit value corresponds to a least significant bit (LSB).

15. The operation method of claim 9, wherein the first signal corresponds to a first differential signal, and the second signal corresponds to a second differential signal comprising a polarity that is opposite to a polarity of the first differential signal.

16. A memory device comprising:
a memory interface circuit configured to receive a data signal from a memory controller; and
a control logic circuit configured to perform a control operation based on the data signal received from the memory interface circuit,
wherein the memory interface circuit comprises:
a voltage-to-time conversion circuit configured to receive a first data signal and a second data signal and sequentially output a first converted signal and a second converted signal based on a time difference, wherein the time difference is based on a voltage level difference between the first data signal and the second data signal;
a first time comparison circuit configured to receive the first converted signal and the second converted signal, determine a first bit value based on a first first-arrival signal (FAS), and output first data comprising the first bit value, wherein the first FAS comprises one of the first converted signal and the second converted signal;
a delay time generation circuit configured to receive the first data, the first converted signal, and the second converted signal, determine a magnitude relationship between a first delay time and a second delay time based on the first bit value, output a first delayed signal and a second delayed signal based on the magnitude relationship; and
a second time comparison circuit configured to receive the first delayed signal and the second delayed signal, determine a second bit value based on a second FAS, and output second data comprising the second bit value, wherein the second FAS comprises one of the first delayed signal and the second delayed signal.

17. The memory device of claim 16, wherein the voltage-to-time conversion circuit is further configured to:
output the first converted signal before the second converted signal when a first voltage level of the first data signal is higher than a second voltage level of the second data signal, and
output the second converted signal before the first converted signal when the first voltage level is lower than the second voltage level.

18. The memory device of claim 16, wherein the delay time generation circuit comprises:
a first delay circuit configured to receive the first converted signal and the first data and output the first delayed signal; and
a second delay circuit configured to receive the second converted signal and flip data and output the second delayed signal, wherein the flip data comprises a flip bit value that is generated by an inversion operation of the first bit value.

19. The memory device of claim 18, wherein:
the first delay time is greater than the second delay time by a threshold delay time when the first bit value corresponds to a first value and the flip bit value corresponds to a second value, and
the first delay time is less than the second delay time by the threshold delay time when the first bit value corresponds to the second value and the flip bit value corresponds to the first value.

20. The memory device of claim 16, further comprising a decision feedback equalization circuit configured to:
receive the first converted signal, the second converted signal, previous first data, and previous second data,
adjust the time difference based on a bit value of the previous first data and a bit value of the previous second data, and
output a third converted signal and a fourth converted signal to each of the first time comparison circuit and the delay time generation circuit, the third converted signal and the fourth converted signal comprising the adjusted time difference.

* * * * *